(12) United States Patent
Tomioka et al.

(10) Patent No.: US 7,609,793 B2
(45) Date of Patent: Oct. 27, 2009

(54) RADIO RECEIVER AND RADIO RECEIVING METHOD

(75) Inventors: Tazuko Tomioka, Kawasaki (JP);
Hiroshi Yoshida, Yokohama (JP);
Katsuya Nounin, Kawasaki (JP);
Tomoya Horiguchi, Kawasaki (JP); Ren Sakata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 646 days.

(21) Appl. No.: 11/356,956

(22) Filed: Feb. 21, 2006

(65) Prior Publication Data

US 2006/0256884 A1 Nov. 16, 2006

(30) Foreign Application Priority Data

May 11, 2005 (JP) ............................. 2005-138587

(51) Int. Cl.
*H04B 7/10* (2006.01)
*H04L 1/02* (2006.01)
*H04K 1/10* (2006.01)

(52) U.S. Cl. ........................ 375/347; 375/260; 375/267

(58) Field of Classification Search ................ 375/260, 375/267, 347, 259, 346, 316; 455/132, 504
See application file for complete search history.

(56) References Cited

U.S. PATENT DOCUMENTS 4,097,804 A * 6/1978 Yamaguchi et al. ........... 455/73

(Continued)

FOREIGN PATENT DOCUMENTS

JP 2000-049744 2/2000

(Continued)

OTHER PUBLICATIONS

Malvar, "Signal Processing with Lapped Transforms," title and copyright pages, and pp. 88-99, Artech House 1992.

(Continued)

*Primary Examiner*—Shuwang Liu
*Assistant Examiner*—Brian J Stevens
(74) *Attorney, Agent, or Firm*—Finnegan, Henderson, Farabow, Garrett & Dunner, L.L.P.

(57) ABSTRACT

According to an aspect of the present invention, there is provided with a radio receiver including: one or more antenna which receives radio signals; a plurality of filters which selectively output signals in respective reception bands from the radio signals received by the antenna, adjacent reception bands partially overlapping each other; a plurality of A/D converters disposed correspondingly to the filters to convert the signals output from the respective filters to digital signals; extracting units which extract signal components of a boundary radio signal spreading across at least two reception bands adjacent to each other from digital signals associated with the at least two reception bands adjacent to each other; a combining unit which combines the signal components extracted by the extracting units to restore the boundary radio signal; and a demodulation unit which demodulates the boundary radio signal restored by the combining unit.

5 Claims, 18 Drawing Sheets

U.S. PATENT DOCUMENTS

| | | |
|---|---|---|
| 6,714,604 B1 | 3/2004 | Tsurumi et al. |
| 7,251,294 B2 * | 7/2007 | Peting ........................ 375/316 |
| 2003/0123565 A1 * | 7/2003 | Fukuda et al. .............. 375/267 |
| 2004/0170376 A1 * | 9/2004 | Tsurumi et al. .............. 386/46 |
| 2004/0192392 A1 * | 9/2004 | Hoppenstein et al. .... 455/562.1 |
| 2005/0143037 A1 * | 6/2005 | Stratis et al. ............. 455/277.1 |
| 2005/0163090 A1 * | 7/2005 | Aoki .......................... 370/338 |

FOREIGN PATENT DOCUMENTS

| | | |
|---|---|---|
| JP | 2004-221808 | 8/2004 |
| JP | 3583962 | 8/2004 |

OTHER PUBLICATIONS

Notification of Reasons for Rejection from Japanese Patent Office mailed Dec. 16, 2008, in Japanese Patent Application 2005-138587 and English translation thereof (4 pages total).

Mitola III, et al., "Cognitive Radio: Making Software Radios More Personal", IEEE Personal Communications, pp. 13-18, (Aug. 1999).

* cited by examiner

FIG. 4B BOUNDARY RADIO SIGNAL

FIG. 4A ORDINARY RADIO SIGNAL

38: SAMPLE POINT

RADIO RECEIVER AND RADIO RECEIVING METHOD

CROSS-REFERENCE TO RELATED APPLICATIONS

This application claims the benefit of priority under 35 USC §119 to Japanese Patent Application No. 2005-138587 filed on May 11, 2005, the entire contents of which are incorporated herein by reference.

BACKGROUND OF THE INVENTION

1. Field of the Invention

The present invention relates to a wideband radio receiver and a radio receiving method for receiving radio signals.

2. Related Art

With development of informationalized society, communication means that can be used in close-at-home scenes increase by leaps and bounds and the increase in communication rate is also remarkable. There are instances in which bands that have been used for a specific use are diverted to a different use in order to increase the communication rate. For example, in radio communication, the law stipulates that a specific band should be limited to a specific use; however, some bands are opened to a plurality of uses. In future, there is a possibility that a very wide band such as UWB (Ultrawideband) will be opened only to low-power-short-distance-communication so as to overlap other uses. In addition, study of a scheme called cognitive radio has been started. In the cognitive radio, an unlicensed terminal can use a band a specific system is licensed to use under present conditions, only in a place where and at time when the specific system does not use the band (see Japanese Patent No. 3583962).

The basic concept of the cognitive radio is to scan a band having the possibility of use, detect the state of use, search for a usable band and use it. Taking higher rates and wider bands in radio communication in recent years into consideration, it is expected to scan a very wide band and determine to use bands that are included in the very wide band and that are capable of satisfying required performance.

In addition, diversification of the connection form has advanced. Hitherto, the destination to which a radio terminal is connected has been substantially one party, such as a base station, at one time. However, it is expected that many-to-many connections will increase from now on and it will become necessary to connect to a plurality of destinations at the same time.

In the cognitive radio, idleness in the licensed system is detected and the gap is used, as described above. As compared with the bandwidth of the radio signal itself, therefore, the frequency band in which a terminal has capability for transmission and reception is very wide. In addition, since the frequencies in use change according to the states of use of licensed systems, the center frequency cannot be determined at the time of the device design. In other words, no matter which center frequency the propagated radio signal has, it must be received. In addition, with the diversification of the connection forms, there is a possibility that it becomes necessary to receive a plurality of signals that are not predetermined in frequency, at the same time. When it is attempted to receive a plurality of wideband signals respectively having arbitrary frequencies in a very wide band, such as a band between 3 GHz and 10 GHz, and bandwidths of several tens to 100 MHz, several problems are caused.

In the traditional radio communication, signals are typically present in one definite frequency band. Even if a function of receiving a plurality of signals at the same time is demanded as in a receiver in a base station, center frequencies and bandwidths of all signals are previously already known at the stage of design and the relative bandwidth of the whole bandwidth that should contain those signals is comparatively small. Therefore, it is sufficient to prepare as many receivers associated with respective frequencies or as many receivers that can be tuned in a comparatively narrow range as the number of supposed simultaneous connections.

On the other hand, in the cognitive radio, a terminal might be necessary to receive seven signals dispersed around 4 GHz in frequency in a certain time zone and receive nine signals dispersed around 9 GHz in frequency in another time zone. According to analogical inference from an ordinary radio receiver, in such a case, for example, ten receivers that can be tuned in the range between 3 GHz and 10 GHz are provided. However, the tuning range is too wide and it cannot be said to be realistic. If it is designed to have ten receivers, an eleventh signal cannot be received, resulting in limited performance. Yet, it is not realistic to previously provide, for example, 100 receivers.

SUMMARY OF THE INVENTION

According to an aspect of the present invention, there is provided with a radio receiver comprising: one or more antenna which receives radio signals; a plurality of filters which selectively output signals in respective reception bands from the radio signals received by the antenna, adjacent reception bands partially overlapping each other; a plurality of A/D converters disposed correspondingly to the filters to convert the signals output from the respective filters to digital signals; extracting units which extract signal components of a boundary radio signal spreading across at least two reception bands adjacent to each other from digital signals associated with the at least two reception bands adjacent to each other; a combining unit which combines the signal components extracted by the extracting units to restore the boundary radio signal; and a demodulation unit which demodulates the boundary radio signal restored by the combining unit.

According to an aspect of the present invention, there is provided with a radio receiving method comprising: receiving radio signals at one or more antenna; selectively outputting signals included in each of a plurality of preset reception bands from the received radio signals, adjacent reception bands partially overlapping each other; conducting A/D conversion on the output signals to generate digital signals; extracting signal components of a boundary radio signal spreading across at least two reception bands adjacent to each other from digital signals associated with the at least two reception bands adjacent to each other; combining the extracted signal components to restore the boundary radio signal; and demodulating the restored boundary radio signal.

DESCRIPTION OF THE EMBODIMENTS

Hereafter, embodiments of the present invention will be described with reference to the drawings.

Figure 1A:
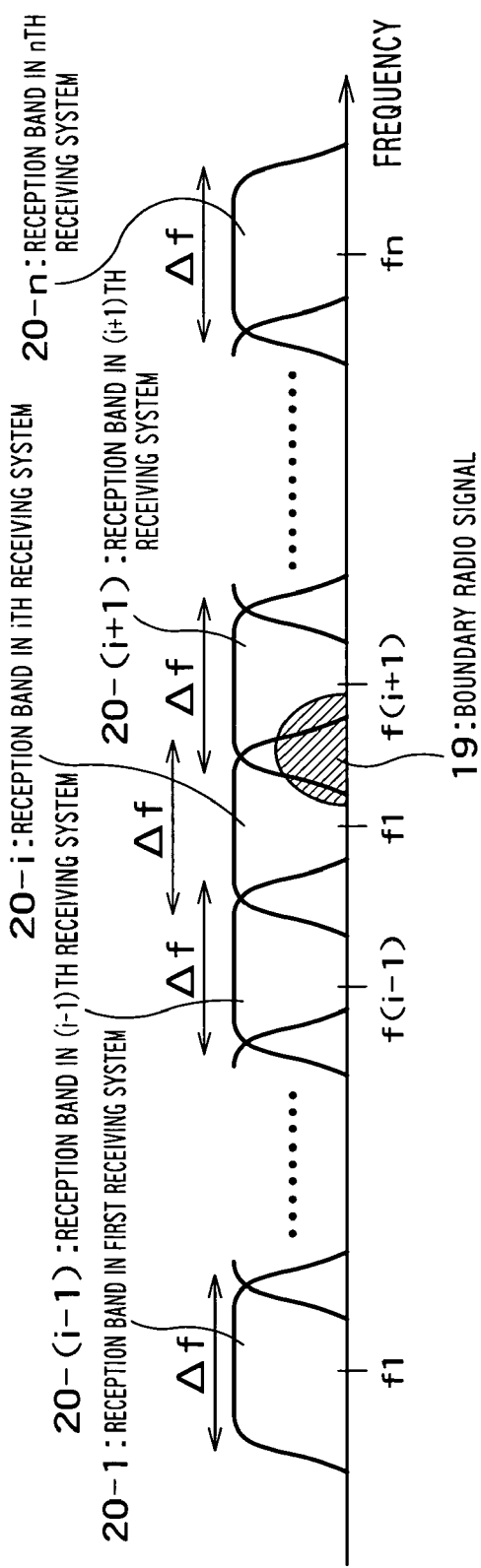
FIGS. 1A and 1B are diagrams showing reception bands of receiving systems in a radio receiver shown in FIG. 2 and a boundary radio signal spreading across two receiving systems.
Figure 1B:
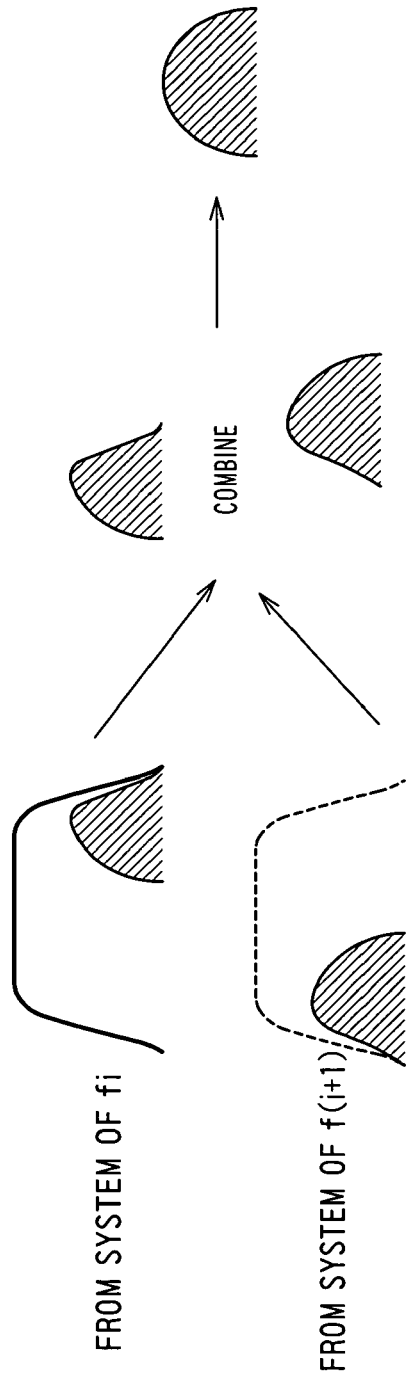
Figure 2:
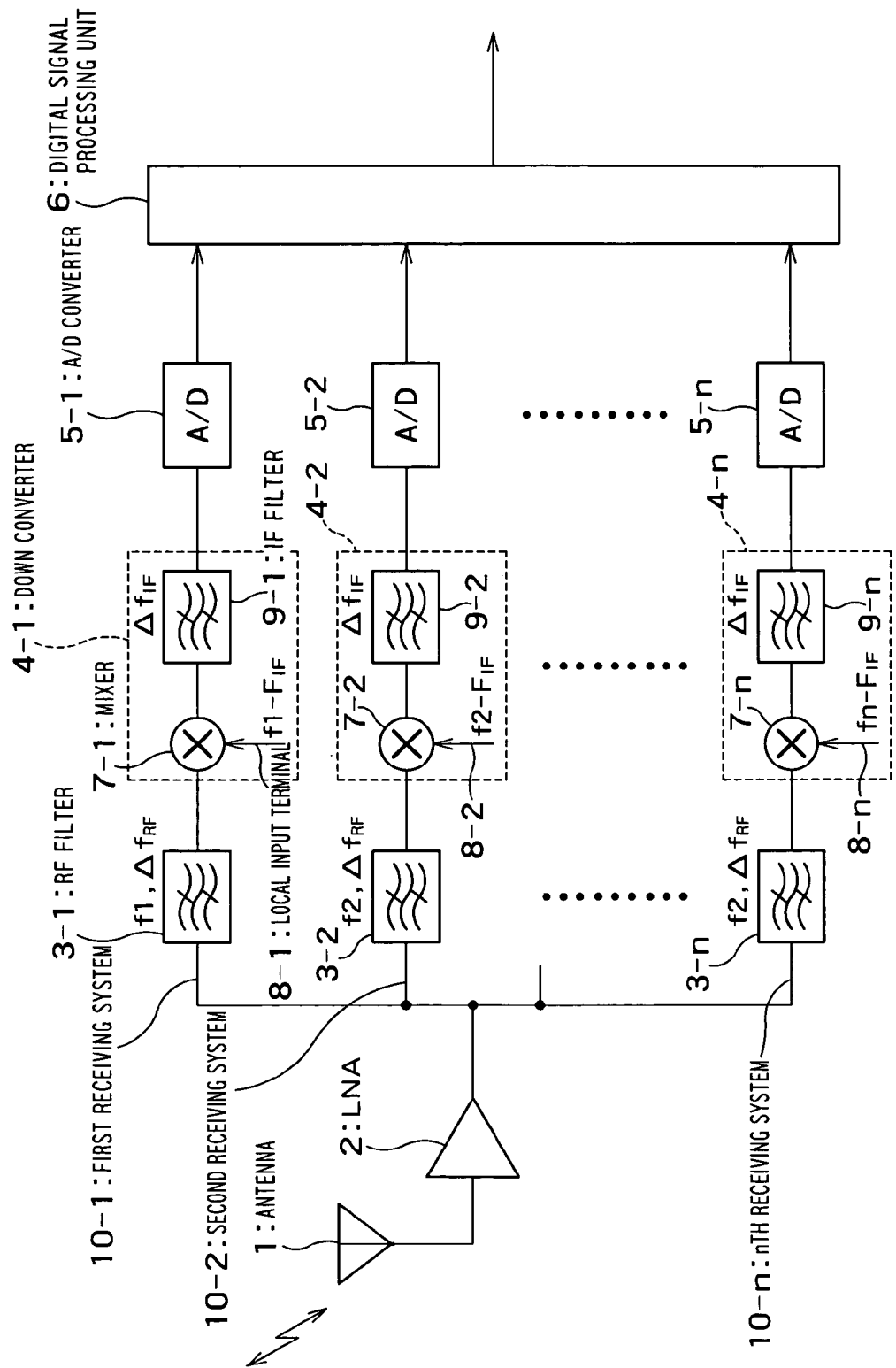
FIG. 2 is a diagram schematically showing a configuration of a radio receiver in an embodiment of the present invention.

FIGS. 1A and 1B are a diagram showing the concept of the present invention. FIG. 2 is a diagram showing a configuration of a radio receiver in a representative embodiment of the present invention. In the drawings, only portions directly relating to the present invention are shown. Components that do not directly relate to the present invention, such as the power supply, are omitted, even if they are indispensable when designing the receiver.

Figure 5:
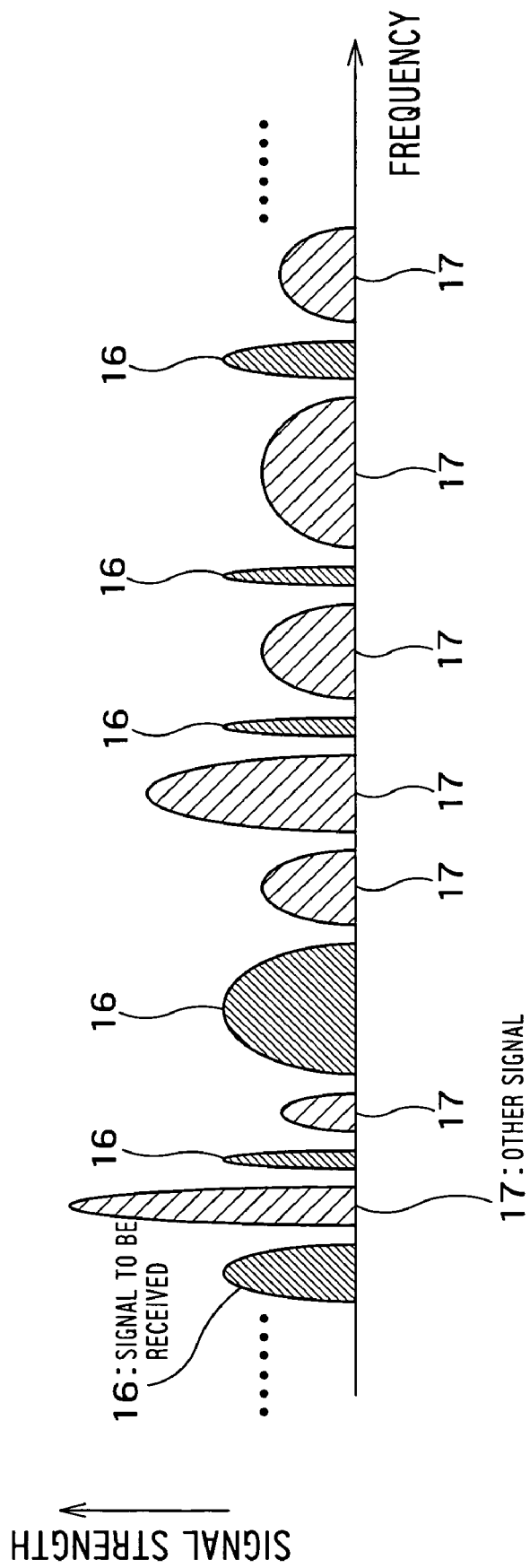
FIG. 5 is a diagram showing an example of frequency arrangements of received signals.

The receiver shown in FIG. 2 is a receiver for cognitive radio. There is a possibility that signals to be received by the receiver are interspersed arbitrarily in a wide frequency range, such as a range of 3 GHz to 10 GHz. FIG. 5 shows its image. Signals represented by dark shaded regions are signals 16 to be received, and signals represented by bright shaded regions are other signals 17. In spaces between other signals 17, there are a plurality of signals 16 to be received. Center frequencies respectively of the signals 16 to be received are indefinite at the time of the device design except that they are within the above-described range, and they are not determined until the time when transmission and reception are started. Furthermore, their bandwidths are also various. Even if there are specifications concerning the bandwidths, such as an upper limit of 1 GHz and a lower limit of 300 kHz, the range is wide and the bandwidth is substantially indefinite at the time of device design. The bandwidth is not determined until the time when transmission and reception are started.

Such signals are received by the receiver shown in FIG. 2. An RF (Radio Frequency) signal received by an antenna 1 is first amplified by an LNA (Low Noise Amplifier) 2, branched to a necessary number, and input to n receiving systems 10 (10-1, 10-2, ..., 10-n). As shown in FIG. 1A, reception bands of receiving systems have respectively f1, f2, ..., fn in center frequency and $\Delta f$ in bandwidth. Differences between center frequencies of adjacent reception bands and the bandwidth of reception bands are fixed in FIG. 1A. However, they may not be fixed necessarily.

In each receiving system, for example, in the first receiving system 10-1, filtering is first conducted by an RF filter 3-1. The main object of RF filter 3-1 is to prevent an image signal from being folded back and overlapping a desired signal when conducting down-conversion to IF (Intermediate Frequency) in a subsequent stage, and it is designed to achieve the object. In the first receiving system 10-1, a bandpass signal having a center frequency f1 and a bandwidth $\Delta f$ is received as shown in FIG. 1A. It is sufficient that the center frequency and bandwidth at the stage of input to a subsequent A/D converter 5-1 have the corresponding frequencies respectively to an RF center frequency f1 and the bandwidth $\Delta f$, and it is not necessary that the center frequency and bandwidth of the RF filter 3-1 are f1 and $\Delta f$, respectively. For the time being, it is supposed that the center frequency is f1 and the bandwidth is $\Delta f_{RF}$. A signal output from the RF filter 3-1 is converted to an IF frequency by a down converter 4-1. The down converter 4-1 includes a mixer 7-1 which mainly conducts frequency conversion and an IF filter 9-1 which conducts filtering on a mixer output. Besides the RF signal, a local signal is input from a local input terminal 8-1 to the mixer 7-1. Supposing that the desired center frequency at the IF is $F_{IF}$, the frequency of the input local signal is set equal to f1-$F_{IF}$. By doing so, the RF signal having the center frequency f1 is down-converted to an IF signal having the center frequency $F_{IF}$. The signal obtained by the down converting is shaped by the IF filter 9-1. The IF filter 9-1 has a center frequency $F_{IF}$ and a bandwidth $\Delta f_{IF}$. In total obtained by combining characteristics of the RF filter 3-1 with characteristics of the IF filter 9-1, the input to the A/D converter 5-1 has a center frequency $F_{IF}$ (corresponding to the RF center frequency f1) and a bandwidth $\Delta f$. Therefore, a filter determining the reception band of each receiving system is a combination of the RF filter and the IF filter in the receiver shown in FIG. 2.

The bandwidth $\Delta f$ at the time when the signal is input to the A/D converter is greater than the difference between RF center frequencies of receiving systems having adjacent reception bands, for example, f2-f1. As shown in FIG. 1A, reception bands apparently overlap. In this way, the signal that has $F_{IF}$ (corresponding to the RF center frequency f1) in center frequency and $\Delta f$ in bandwidth is input to the A/D converter 5-1, sampled, and converted to a digital signal.

By the way, a gain adjuster may be disposed in a stage preceding the A/D converter to conduct level adjustment on the down-converted signal before being input to the A/D converter so as to make the level of the down-converted signal suitable for the input range of the A/D converter.

A digital signal output from the A/D converter is input to the digital signal processing unit 6. The digital signal processing unit 6 is a unit which conducts digital signal processing concerning a physical layer of the receiver. Not only the signal from the first receiving system 10-1 but also signals from other receiving systems 10-2, ... 10-n are input to the digital signal processing unit 6 at the same time.

Figure 3:
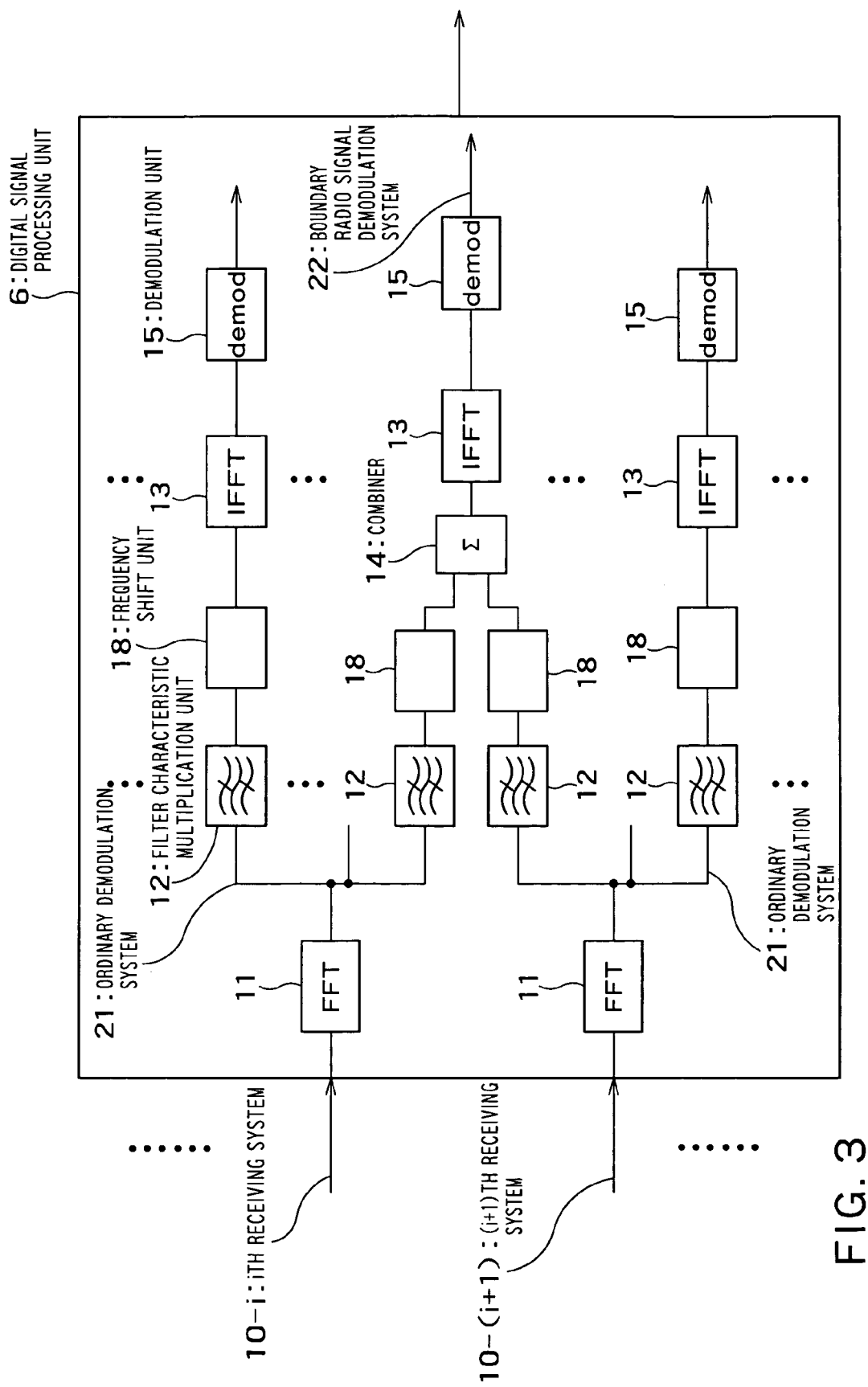
FIG. 3 is a diagram showing a configuration example of a digital signal processing unit.

FIG. 3 shows a configuration example of the digital signal processing unit 6. The configuration shown in FIG. 3 has a form in which the digital signal input from each receiving system is temporarily transformed to a signal in the frequency domain, converted to a baseband signal in the frequency domain, transformed to a signal in the time domain, and then demodulated.

A signal input from a receiving system is transformed to a signal in the frequency domain by an FFT (Fast Fourier Transform) unit 11. In other words, a signal in the time domain is sampled, a frame including a definite number of samples is formed and the Fourier transform is conducted by taking a frame as the unit. As a result, a signal in the frequency domain is generated. If the definite number is 256, the number of signals (the number of frequency points) in the frequency domain obtained after the transform is the same number, 256. In this case, the number of effective frequency points is half of 256, i.e., 128. Remaining 128 points are image components of them. Signals in the frequency domain obtained after the transform are divided into the number of radio signals to be received included in this system, and they are respectively input to filter characteristic multiplication units 12.

First, an ordinary demodulation system 21 for demodulating radio signals other than the boundary radio signal will be described. Signals obtained by transformation to the frequency domain become a numerical value sequence having a signal amplitude and phase (or a real part and an imaginary part) corresponding to each frequency point. The filter characteristic multiplication unit 12 conducts filtering and extracts a radio signal to be demodulated by the demodulation system. Specifically, a numerical value sequence having frequency characteristics of a filter suitable for the frequency, bandwidth and modulation form of the radio signal are prepared. The filter characteristic multiplication unit 12 multiplies a frequency numerical value sequence of the input signal by the prepared filter numerical value sequence, and outputs a result. The output of the filter characteristic multiplication unit 12 is input to a frequency shift unit 18. In the present embodiment, a radio signal to be received exists at an arbitrary frequency in the reception band of each receiving system. In other words, although the received signal is downconverted to a predetermined IF band, a radio signal to be received exists at an arbitrary frequency in the IF band. The frequency shift unit 18 converts the radio signal to a frequency that can be easily demodulated. In the output of the filter characteristic multiplication unit 12, the number of effective frequency points other than frequency points that can be neglected because their values are 0 or sufficiently small is smaller than the number of frequency points in the output of the FFT unit 11 in most cases. It is also possible to conduct IFFT (inverse FFT) on the signal after the filtering, restore the signal to a time domain waveform, and conduct demodulation, without inserting the frequency shift unit 18. Since the processing time in the FFT and IFFT greatly depends on the number of frequency points, however, it is desirable that the number of frequency points be small to reduce the processing. Furthermore, the number of points in the frequency domain is reflected into the number of components in the time domain (the number of sample points in the frame). If the number of points is large in the frequency domain, therefore, the number of components in the time domain also increases. In situations where values of the frequency domain points are made 0 other than radio signals to be received, by the filtering conducted in the filter characteristic multiplication unit 12, however, even if the number of components in the time domain increases, it is an increase that is meaningless from the viewpoint of the sampling theorem and the information content does not increase. On the other hand, even if only points that are effective in the frequency are transformed to signals in the time domain by the IFFT, the information content does not decrease. In order to reduce the amount of processing, therefore, frequency points after the filtering are shifted to lower frequencies by the frequency shift unit 18 and unnecessary high frequency points are discarded to reduce the number of points. An IFFT unit 13 transforms the output of the frequency shift unit 18 to a signal in the time domain. A demodulation unit 15 demodulates the signal, transforms it into data, and outputs the data thus taken out.

According to the radio signal modulation scheme, demodulation can be conducted without needing the IFFT, in some cases. For example, in modulation scheme carrying information on the frequency axis, such as the OFDM (Orthogonal Frequency Division Multiplexing), the IFFT step is not necessary if conditions such as the sampling frequency, the frame length and frame-application timing are met.

The case where a radio signal to be received is ordinarily placed in the reception band of one receiving system has been described heretofore. One of features in the present embodiment is found in the case where a radio signal is spreading across a plurality of reception bands as hereafter described.

In FIG. 1A, a boundary radio signal 19 spreading across the ith receiving system and the (i+1)th receiving system as represented by a shaded region is supposed. As shown in FIGS. 1A and 2, reception bands of respective receiving systems are fixed, and the boundary radio signal 19 is not settled in one reception band. The receiver according to the present embodiment includes a demodulation system 22 for boundary radio signal as shown in FIG. 3 in order to demodulate such a radio signal spreading across a plurality of reception bands (boundary radio signal).

As shown in FIG. 1B, the ith receiving system receives a low frequency component of the boundary radio signal 19 shown in FIG. 1A whereas the (i+1)th receiving system receives a high frequency component of the boundary radio signal 19. They are combined to restore the original boundary radio signal, and the restored original boundary radio signal is demodulated. Specifically, processing is conducted as hereafter described. Description concerning the portions shown in FIG. 2 is the same as that in the case of the ordinary signal, and it thus will be omitted.

As shown in FIG. 3, a signal obtained by conducting the A/D conversion in the ith receiving system and a signal obtained by conducting the A/D conversion in the (i+1)th receiving system are input to the digital signal processing unit 6. These signals contain parts of the boundary radio signal 19, respectively. Each of these signals is transformed to a signal in the frequency domain by the FFT unit 11. Subsequently, filtering is conducted by a filter characteristic multiplication unit 12 and only the boundary radio signal is extracted. Information concerning the boundary radio signal, such as the center frequency and bandwidth, is known because they had been determined previously when starting communication and a notice thereof was sent via a control channel or the like. The filter characteristic multiplication unit 12 multiplies its input signal by filter frequency characteristics determined so as to filter out frequency components including the boundary radio signal 19. Since operation on frequencies outside the reception band is not necessary, however, it is not necessary to conduct processing on portions of the filter characteristics outside the reception band. Frequency components thus extracted are subject to a frequency shift in a frequency shift unit 18. In the case of the boundary radio signal 19, a low frequency portion of the boundary radio signal 19 is on a high frequency end of the reception band in the ith receiving system and a high frequency portion of the boundary radio signal 19 is on a low frequency end of the reception band in the (i+1)th receiving system. Therefore, it is necessary to restore the correct position of the low frequency portion and the high frequency portion in the boundary radio signal 19 to conduct combining. Unlike the case of the ordinary demodulation system 21, therefore, the frequency shift unit 18 is indispensable in the boundary radio signal demodulation system 22.

As described later, the number of a frequency component in a receiving system corresponding to the number of a certain frequency component in the overlapping receiving system is previously is known. Therefore, frequency shift is conducted to correct relative relations between signal components of the boundary radio signal in the receiving systems. At this time, only one of them may be moved; in that case, however, a part of the moved component goes out of the number of FFT points, and consequently it is necessary to move it into the range of the IFFT again when conducting the IFFT in a subsequent stage. When combining them or before combining them, it is desirable to shift both frequencies and move them into the range of frequency components corresponding to the IFFT. In the same way as the case of the above-described ordinary signal, it is desirable to conduct a shift to the low frequency side to make the components meet the minimum necessary number of points.

The signal components of the boundary radio signal thus shifted respectively in frequency to have a correct relative relation are input to a combiner 14 and combined. There are various ways of conducting combination, and details of them will be described later. A signal obtained by the combining conducted in the combiner 14 is restored to the state close to the original boundary signal before being divided into a plurality of receiving systems as shown in FIG. 1B.

It is necessary to correct a difference in delay between the receiving systems, before conducting the combining. However, details will be described later.

An output of the combiner 14 is input to an IFFT unit 13, transformed to a time domain signal, and then demodulated to data by a demodulation unit 15.

By thus providing a function of correctly combining portions obtained by dividing the boundary radio signal into a plurality of receiving systems and restoring the boundary radio signal, it becomes possible in the present embodiment to receive radio signals having an indefinite number and each having a center frequency and a bandwidth that are indefinite in wide ranges, by using a fixed number of receiving systems.

Figure 4:
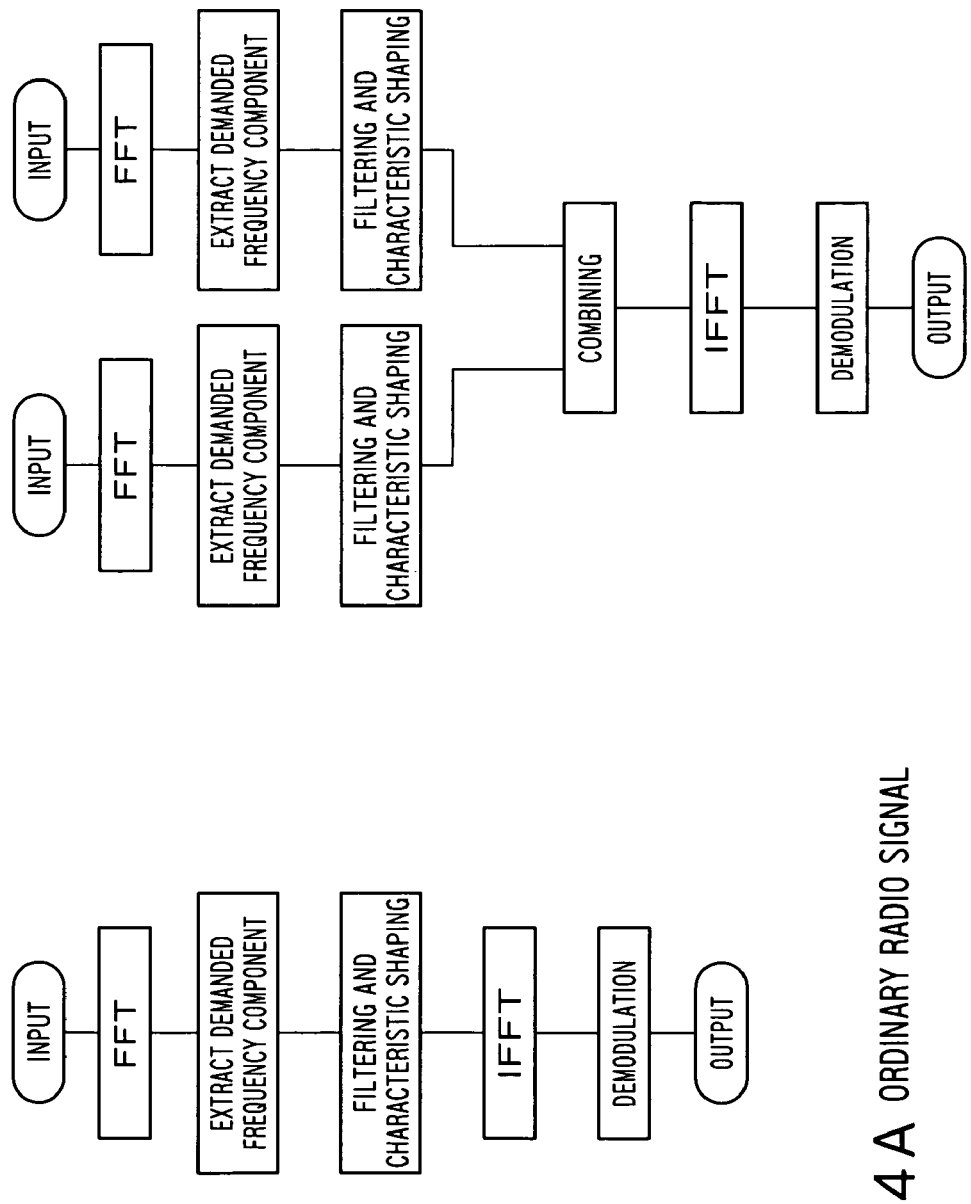
FIGS. 4A and 4B are diagrams showing flows executed when the digital signal processing unit is formed of software.

In FIG. 3, the configuration of the digital signal processing unit is shown in a form of a block diagram. In practice, there are program modules executing respective functions, and a numerical value sequence corresponding to a signal is suitably processed in those modules. Various configurations of the digital signal processing unit are possible. Either of a form described as software substantially on a computer, such as the DSP, and a form of conducting processing fixedly or semi-fixedly such as FPGA or ASIC is possible. By describing the form of FIG. 3 as software flows, flows shown in FIGS. 4A and 4B are obtained. FIG. 4A shows the case of an ordinary radio signal, whereas FIG. 4B shows the case of a boundary radio signal. Since contents are the same as those described with reference to FIG. 3, description of them will be omitted. There is a main program (blocks in FIGS. 4A and 4B) describing the processing flow for a signal depending upon the signal nature (the ordinary radio signal and the boundary radio signal). Processing is executed calling in the main program a subroutine corresponding to each processing block.

In FIG. 3, the digital signal is temporarily transformed into the frequency domain, and the filtering and the frequency shift are conducted in the frequency domain. Such a method has a merit that the processing in the frequency domain such as the filtering and the frequency shift can be conducted simply. However, the method also has a demerit that the processing of the FFT and IFFT is necessary. On the other hand, it is also possible to conduct processing on a digital signal in the time domain without transforming the digital signal into the frequency domain. In this case, the processing time required for the Fourier transform can be shortened. However, frequency processing such as filtering becomes complicated.

Figure 6:
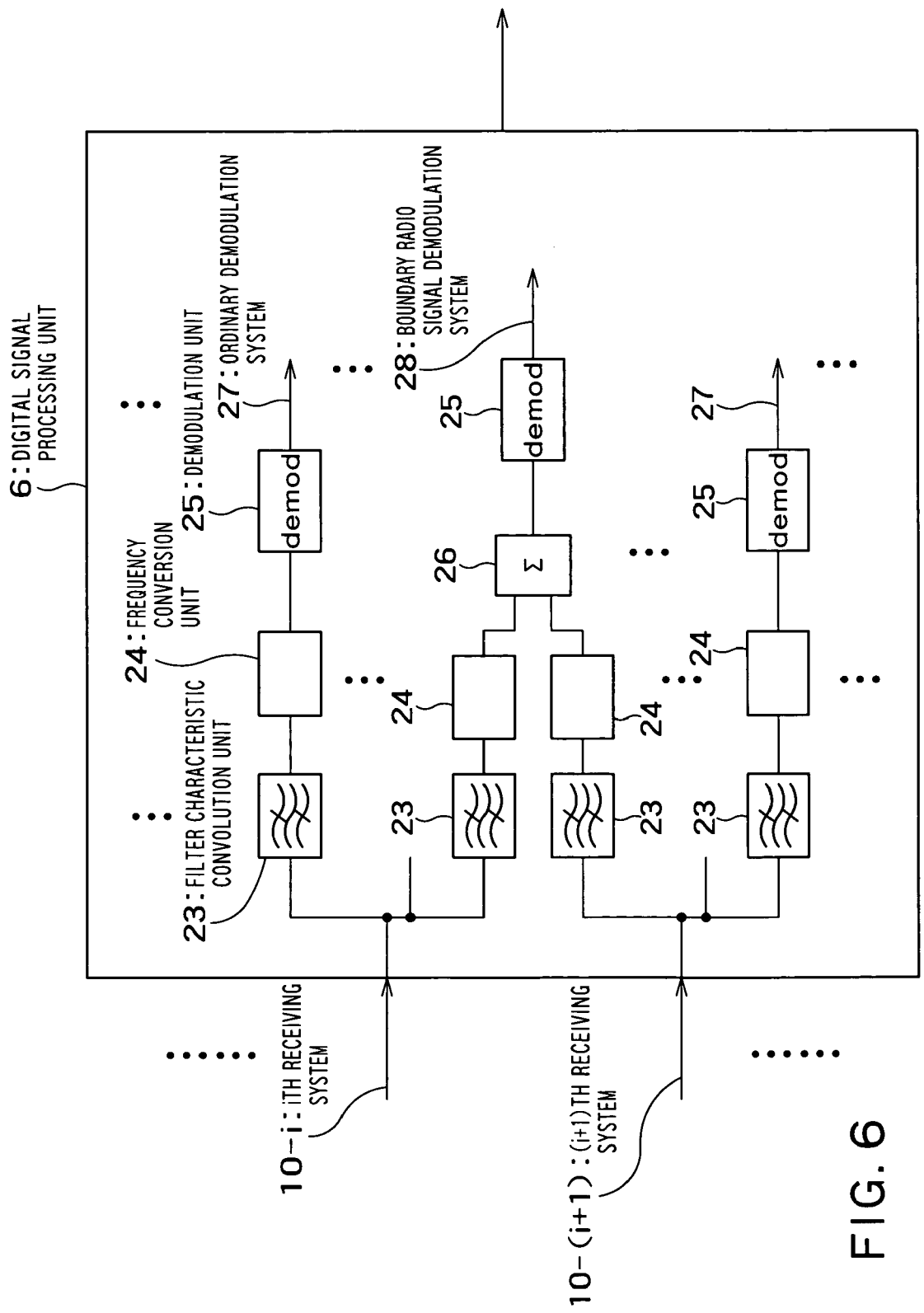
FIG. 6 is a diagram showing another configuration example of the digital signal processing unit.

FIG. 6 shows another configuration example of the digital signal processing unit 6. A signal input from each receiving system is branched to the number of radio signals to be received in the reception band. From each radio signal, only a signal to be modulated by the demodulation system is extracted by a filter characteristic convolution unit 23. The filter characteristic convolution unit 23 substantially has a function equivalent to that of the filter characteristic multiplication unit 12 shown in FIG. 3. In order to conduct filtering in the time domain, however, the filter characteristic convolution unit 23 conducts processing of convolving an impulse response of filter characteristics having characteristics equivalent to those of the filter shown in FIG. 3 into its input signal. Specifically, the filter characteristic convolution unit 23 multiplies the input signal by a waveform obtained by inverting the time axis of the impulse response of the filter characteristics over a window time of the impulse response and integrates (adds) resultant products. By conducting this while shifting time points of the input signal, a desired signal is extracted at the output of the filter characteristic convolution unit 23. The output is converted to a frequency suitable for demodulation by a frequency conversion unit 24. Operation of the frequency conversion unit is substantially the same as that in the case of analog processing. In other words, the input signal is multiplied by a local signal waveform, and results are filtered suitably by convolution. Subsequently, a signal obtained by the filtering is demodulated by a demodulation unit 25.

If the demodulation unit 25 has a function of selecting a frequency to be demodulated, the frequency conversion unit 24 is not necessary. For example, if the demodulation unit 25 conducts synchronous detection by using a local signal having a variable frequency and then removes unnecessary signals by using a suitable low pass filter, the frequency conversion unit 24 is not necessary.

In addition, if the signal modulation scheme is suitable for synchronous detection and the signal is an ordinary signal which is not the boundary radio signal, it is also possible to input the input signal to the demodulation unit immediately after the branching of the input signal without using the filter characteristic convolution unit 23, by using a demodulation unit having a frequency selection function. This is true of the case of FIG. 3, and in such a way, the steps of the FFT and IFFT also become unnecessary. In the form shown in FIG. 3, however, the FFT, IFFT, filtering and frequency shift are necessary to conduct combining to reconstruct the boundary radio signal. Preferably, therefore, the FFT, IFFT and so on are applied to only the boundary radio signal after the branching of the signal.

In the form shown in FIG. 6 as well, the filter characteristic convolution unit 23 and the frequency conversion unit 24 are indispensable when demodulating the boundary radio signal. Hereafter, the case where the boundary radio signal is demodulated will be described. In the same way as the case shown in FIG. 3, there is a radio signal on a boundary between the ith receiving system and the (i+1)th receiving system. From a signal input from the ith receiving system and branched, only the boundary radio signal is extracted in the filter characteristic convolution unit 23. The same is true of the signal input from the (i+1)th receiving system as well. These extracted boundary radio signals are subjected to frequency conversion respectively by frequency conversion units 24 to have a correct relation in relative frequencies. The difference in down conversion frequency between the ith receiving system and the (i+1)th receiving system is already known. Furthermore, the ratio of the sampling frequency to the difference is constant as described later. As a result, it is possible to conduct frequency conversion so as to make the relative frequency relation correct. The signals thus subjected to the frequency conversion are input to a combiner 26. Detailed configuration and operation of the combiner will be described later. These signals are combined by the combiner 26 to restore the original boundary radio signal. The restored boundary radio signal is demodulated to data in a demodulator 25.

Processing of combining signals respectively partially received by a plurality of receiving systems will now be described specifically. First, a form in which the combining is conducted in the frequency domain as shown in FIG. 3 will be described.

Only boundary radio signals are extracted from signals obtained by conducting A/D conversion in respective receiving systems. The boundary radio signals are subjected to frequency shift so as to have suitable frequency relations. Such signals are input to the combiner 14. As schematically shown in FIG. 1B, the boundary radio signal shaved off at the reception band end has a frequency distribution different from the original frequency distribution. The frequency characteristics in the frequency band are determined from the characteristics of the RF filter 3 and the IF filter 9 shown in FIG. 2. As a matter of course, the transmission factor of the amplitude characteristics is small at the end of the reception band. In most cases, the phase is not linear, and is distorted undesirably at the end of the reception band. In the ordinary radio receiver, the signal is filtered out with a margin in the bandwidth in the RF filter and the IF filter. In the baseband filter, the signal is shaped so as to make the signal-to-noise ratio optimum and prevent the undesirable phase rotation. The reason is as follows. If the frequency becomes low as far as the baseband, the filter design is facilitated. Therefore, it is easy to design a filter in which the amplitude roll-off and phase at the filter end are close to ideal ones. In such a case, the RF filter and the IF filter cut off only roughly, and consequently the phase rotation and the amplitude variation at the band end do not pose a problem. Since a feature of the present embodiment lies in the function of demodulating a signal on the reception band end, however, the phase rotation and amplitude variation at the filter end cannot be ignored.

In the present embodiment, each of signals input from a plurality of receiving systems to the combiner is first subject to phase correction. The receiver previously knows the frequency characteristics of respective receiving systems, i.e., at least total filter characteristics of the RF filter and the IF filter applied to signals. A method for the receiver to know the filter characteristics will be described later. The receiver knows filter frequency characteristics of respective receiving systems, and retains respective filter frequency characteristics in the form of numerical value data of phase and amplitude concerning respective frequency points. As regards each frequency point of a signal in the frequency domain input from each receiving system, the combiner first corrects the phase rotation by multiplying the inverse characteristics of the filter phase rotation that the frequency has been subjected to. Since frequency shift is conducted before input to the combiner, an appropriate frequency point in the filter frequency characteristics is selected corresponding to the frequency before the shift. Depending on the combining method, all frequency points of the signals input from a plurality of receiving systems are not necessarily used. Therefore, it is sufficient to conduct phase correction on only frequency points to be used. The phase correction may be conducted not in the combiner but in the filter characteristic multiplication unit. As for the amplitude correction, since there are various ways of correction depending on the combining method and the combining processing sometimes depends on the amplitude attenuation, therefore, it is desirable to conduct the amplitude correction in the combiner. If the amplitude correction is conducted in the filter characteristic multiplication unit, the filter amplitude characteristics or amplitude information lost in the filter characteristic multiplication unit should be sent to the combiner and processed therein.

As for the combining, there are mainly three methods, and in some cases, a combination of the combining methods can be applied.

Figure 7:
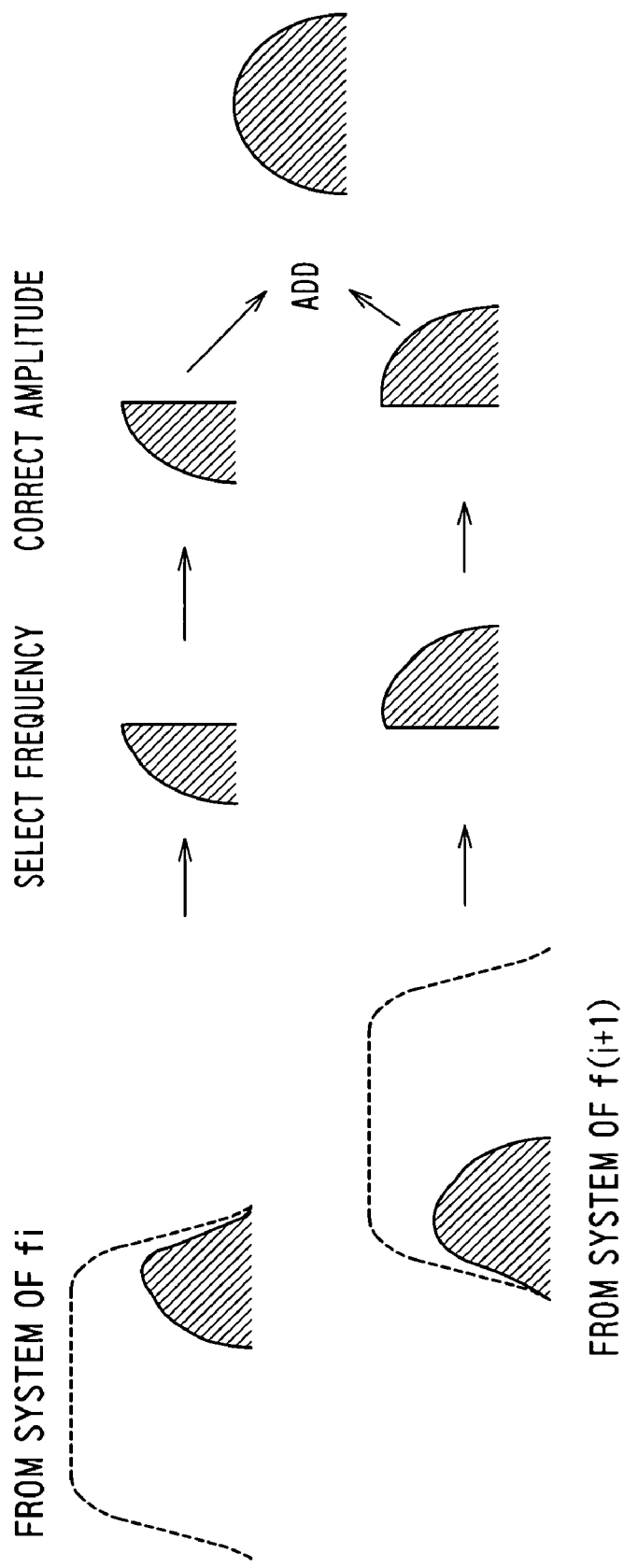
FIG. 7 is a diagram showing selective combining method.

The simplest combining method is selective combining method. The selective combining method will now be described with reference to FIG. 7. FIG. 7 shows the case of the selective combining method in detail in a similar manner to FIG. 1B. The boundary radio signals which are supplied from respective receiving systems and are compensated with the phase are combined. The receiver knows the degree that the amplitude of each frequency point is attenuated at the reception band end in each system. Thus, the receiver selects a component of the system in which the ratio of attenuation is small, with respect to each frequency point. The receiver multiplies the selected component by inverse characteristics of the filter amplitude characteristics for correction, adds the selected components corrected with the amplitude, and thereby restores the original boundary radio signal. At combining, selection may be conducted by independently comparing attenuation values with respect to each frequency point, or may be conducted by, for example, selecting the frequency points for the range from the lowest frequency to a certain frequency from the system of fi and the frequency points for the range from the certain frequency to the highest frequency from the system of f(i+1). If the delay difference completely corrected, the former method is desirable. Comparison of attenuations at each frequency point between systems may be conducted, for example, according to amplitude strengths of both components, or if both systems are connected to the same LNA, according to attenuations at each frequency point in the filter characteristics. The former method is effective when both systems are connected to different LNAs and subjected to different fading. The selective combining method is a comparatively simple method, and a moderate signal-to-noise ratio is obtained.

Figure 8:
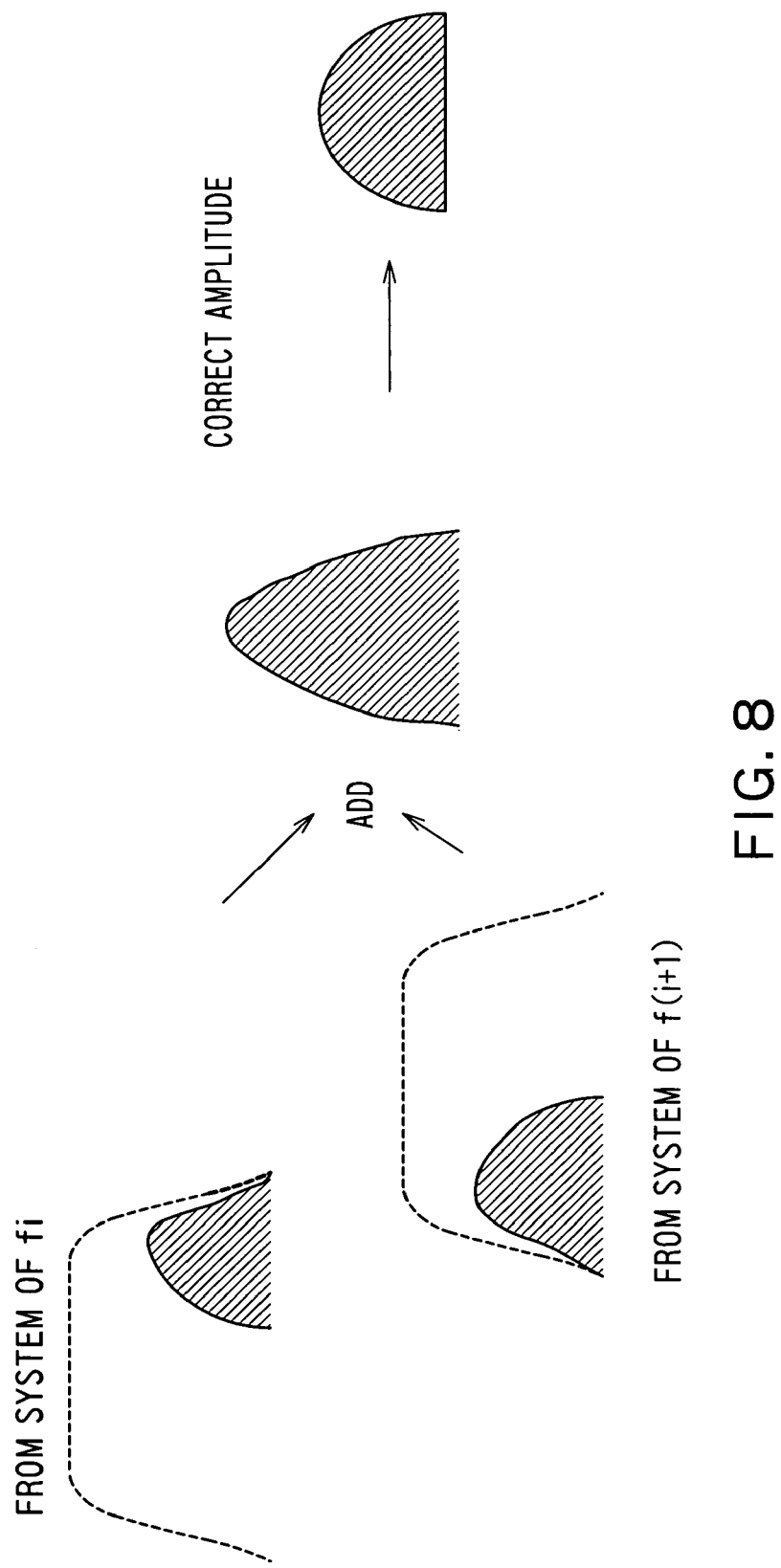
FIG. 8 is a diagram showing equal gain combining method.

A method shown in FIG. 8 is equal gain combining method. All boundary radio signals from respective systems corrected with the phase are added with respect to each frequency point. At the time of addition, a component that is not subjected to attenuation at the filter end and a component that is subjected to attenuation are added at most points. Therefore, frequency characteristics after the addition take a shape different from the frequency characteristics of the original boundary radio signal. Accordingly, respective frequency points are divided by the sum of filter gains (attenuations) of both receiving systems (normalization to gain 1). In this way, the amplitude correction is conducted, and the restored boundary radio signal is obtained. The equal gain combining method is a comparatively simple method. In the case of the present embodiment, quantization noises at the A/D converters are added, and consequently the signal-to-noise ratio is slightly degraded.

Figure 9:
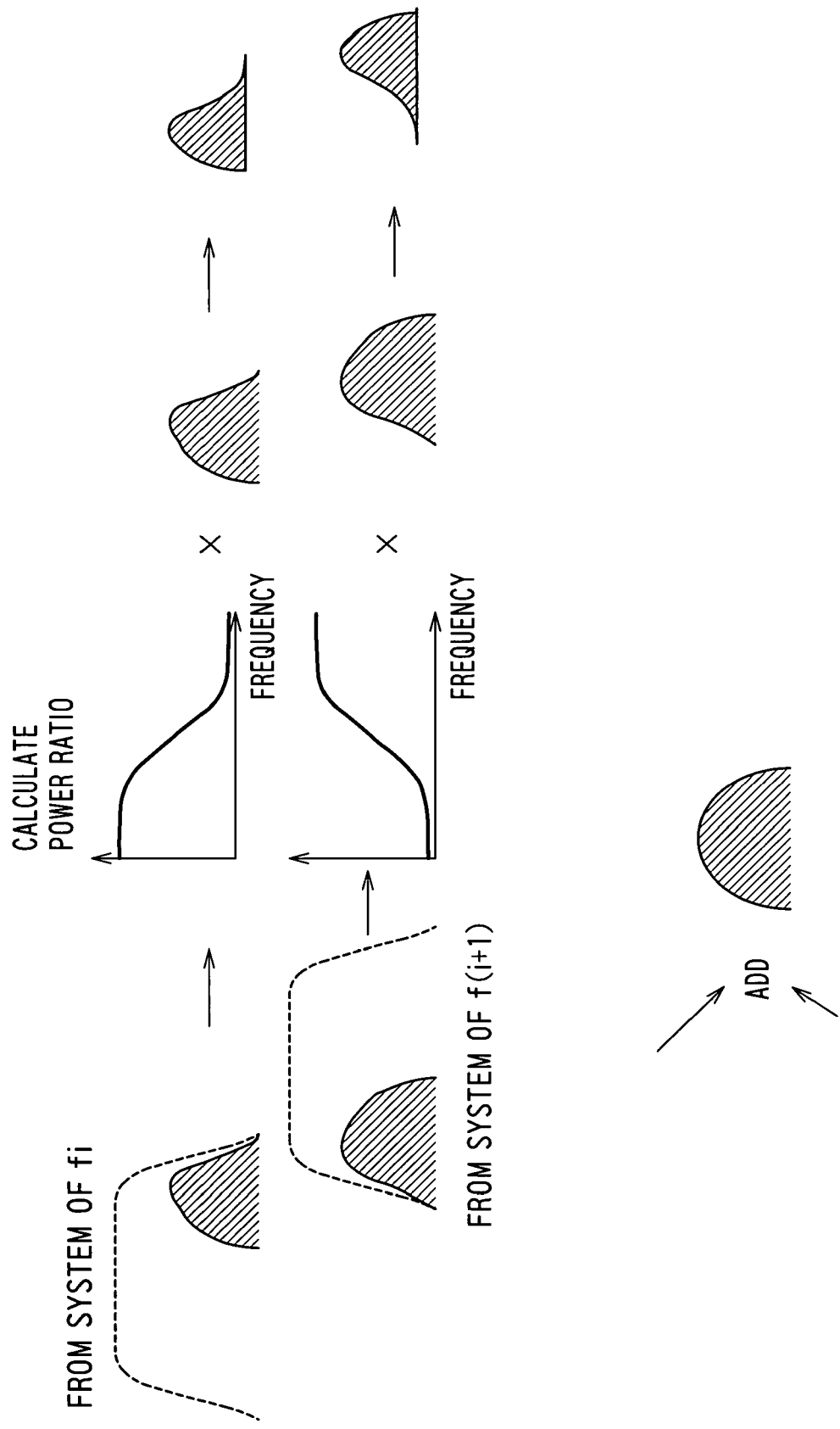
FIG. 9 is a diagram showing maximum ratio combining method.

A combining method shown in FIG. 9 is the maximum ratio combining method. Signals of respective receiving systems are added according to the signal-to-noise ratios. In the present embodiment, the maximum ratio combining method is performed per each frequency point. Strictly speaking, the maximum ratio combining method is a method of adding signals from a plurality of systems with a ratio corresponding to the signal-to-noise ratio; however, since the signal-to-noise ratio cannot be detected easily, the power ratio is used typically instead of the signal-to-noise ratio. In the present embodiment as well, it is appropriate that the power ratio is used instead of the signal-to-noise ratio. In the present embodiment, since it is supposed that the bandwidth of the LNA is sufficiently greater than the bandwidth of each receiving system, the noise added by the LNA in each receiving system has no difference even if the amplitude is attenuated at the reception band end. However, degradation of the signal-to-noise ratio caused by quantization noise at the time of A/D conversion becomes significant near the reception band end. Therefore, the degradation of the signal-to-noise ratio caused by quantization noise can be improved with the maximum ratio combining method using the power ratio.

A specific example will now be described with reference to FIG. 9. The power ratio between signals supplied from the receiving systems and corrected with phase is calculated at each frequency point. Normalization is conducted so as to make the sum of power ratios at a corresponding frequency in both receiving systems unity. The original boundary radio signal can be restored by multiplying the boundary radio signal in each receiving system by the power ratio obtained about each receiving system and adding results in both the systems with regard to every frequency point.

In the maximum ratio combining method, signals with higher signal-to-noise ratio are added with larger ratios, and consequently the total signal-to-noise ratio can be optimized and reception with a higher quality becomes possible.

The three basic combining methods have been described heretofore, and combination of the methods is possible. For example, the maximum ratio combining method brings about the best quality; however, since a portion at the band end shaved off in amplitude by the filter cannot be expected to have a good signal-to-noise ratio, therefore, the selective combining method is used for frequency points at which either receiving system has a filter attenuation characteristic lower than a definite value such as −10 dB, whereas the maximum ratio combining method is conducted for other frequency points. In such a way of doing, the amount of processing such as the power ratio calculation required for the maximum ratio combining method can be reduced.

The combining method heretofore described is intended for a signal in the frequency domain. Also in the case where processing only in the time domain is conducted as shown in FIG. 6, substantially the same processing is conducted. In other words, in the case of the phase correction, numerical values associated with the filter frequency characteristics carrying a quantity of the phase to be corrected and having an amplitude equal to unity are generated. An impulse response thereof is obtained, and convolution is conducted on a signal in the time domain. As for the selection of frequency points at the time of performing the selective combining method as well, processing is conducted using filter characteristics that performs the selection. However, with processing in the time domain and without conducting the Fourier transform, it is difficult to find the magnitude of a signal at each frequency point. In the processings which use the signal magnitudes or the filter attenuations, therefore, it is preferable to conduct the amplitude correction or calculate the power ratios on the basis of, not the magnitude of the signal component but the attenuation characteristics of the RF filter and the IF filter at the band end which are previously already known.

A method for measuring the filter characteristics of the total filter composed of the RF filter and the IF filter which determine the frequency characteristics in the reception band will now be described.

A simplest method is a method of measuring the filter characteristics by using a measuring instrument at the time of adjustment before the receiver shipping and saving results of the measurement in the receiver as data. In this method, it is impossible to include a change caused by deterioration with age and a temperature change in each season. However, a special mechanism is not needed in the receiver.

There is another method of conducting the measurement by using a measurement function included the receiver, when power of the receiver is turned on, or periodically if the power is always in the on-state. A signal is input from the own receiver instead of the output of the LNA, and the signal goes until A/D conversion in the ordinary processing to measure the amplitude and phase at each frequency point. In this case, there are a method of inputting a synthesized local signal, i.e., a single frequency signal from a synthesizer in the receiver (where the magnitude of the input has become an already known value by automatic gain control, or it is measured by branching the signal) and measuring the signal magnitude obtained after the A/D conversion, and a method of inputting white noise or a spectrum-spread signal close to the white noise, conducting the FFT, and measuring the magnitude of each frequency point. In the case where processing is conducted only in the time domain using the digital signal processing unit, the former method is applied.

Figure 10:
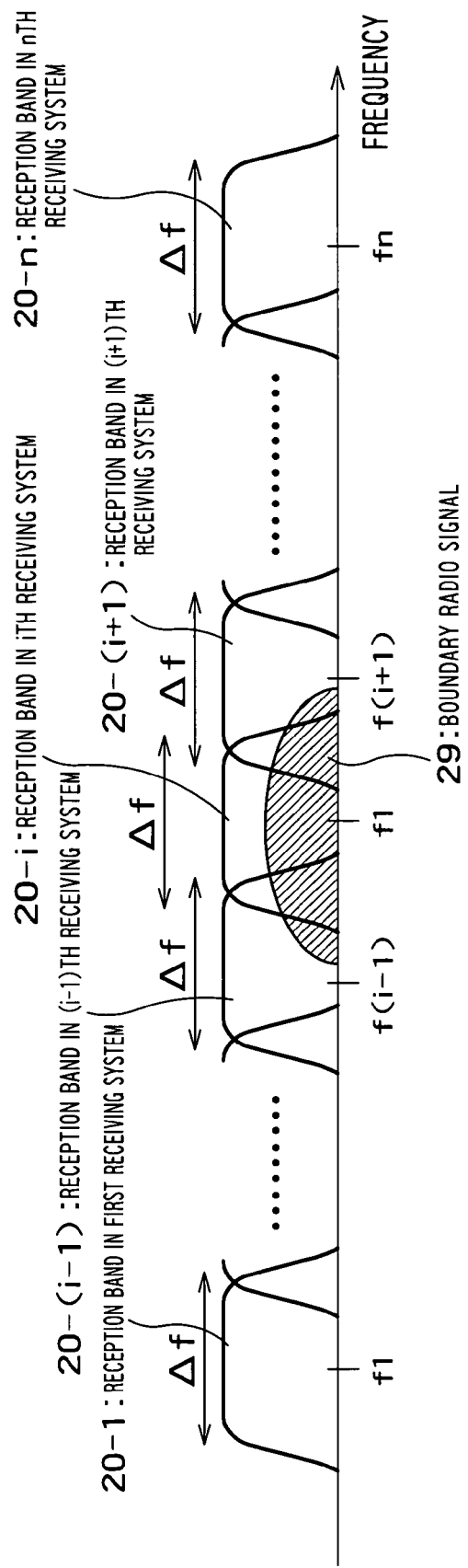
FIG. 10 is a diagram showing an example of a boundary radio signal spreading across three reception bands.

The case where combining is conducted on two receiving systems has heretofore been described. If the radio signal has a very wide bandwidth as shown in FIG. 10, combining must be conducted on more than three receiving systems in some cases. The combining method and the procedure for correcting the phase and amplitude at the band end at the time of combining are the same as those in combining on two receiving systems. Since the bandwidth is wide, however, the following contrivance is needed.

When processing is conducted in the frequency domain, signals are combined to have the number of components exceeding the number of frequency components of the FFT in each system. IFFT must be executed with the number of components incorporating the whole of a boundary radio signal 29. As a result, the signal in the time domain after the IFFT has a waveform that is faster in sample rate than the signal after the A/D conversion. It is necessary that the digital signal processing unit be capable of conducting processing on such a waveform. If the digital signal processing unit is formed of ASIC, the ASIC must have a configuration corresponding to such a processing rate (a rate that is a factorial of 2 times as high as that at the time of A/D conversion, which is, in the case of FIG. 10, a processing rate that is twice). If the digital signal processing unit is formed of software on a DSP, it is necessary to assign extra calculation resources to signals increased in sample rate. If it is impossible to follow the increased sample rate, preferably, it is coped with by, for example, parallel processing in CPUs.

Also in the case where processing is conducted in the time domain, a similar problem occurs. Before the combining, frequency conversion is conducted to make the relative frequency relation suitable. At that time, the highest frequency component exceeds a frequency that can be represented at the sample rate of the signal. Therefore, the frequency shift cannot be conducted as they are. Accordingly, it is necessary to interpolate the temporal waveform of the signal to have an increased sample rate, conduct the frequency conversion with the increased sample rate, and conduct all subsequent processing with the increased sample rate. For combining, it is necessary to increase sample rates of other signals as well to have the same sample rate as the fastest sample rate. In the same way as the case where the processing is conducted in the frequency domain, it is necessary to be provided with a CPU capable of temporally coping with the increased sample rate, or cope with the increased sample rate by using parallel processing.

Figure 11:
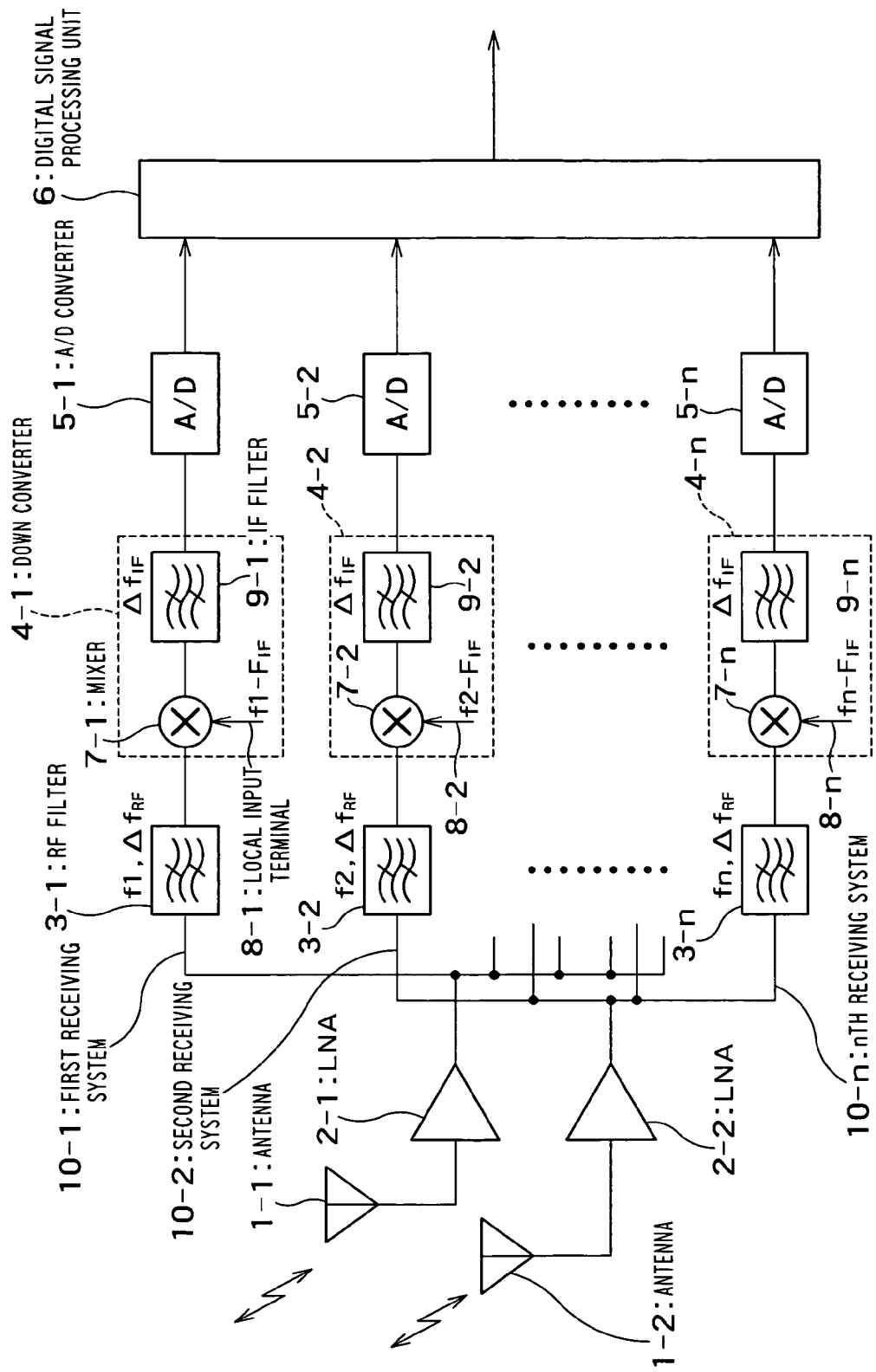
FIG. 11 is a diagram schematically showing another configuration example of a radio receiver.
Figure 12:
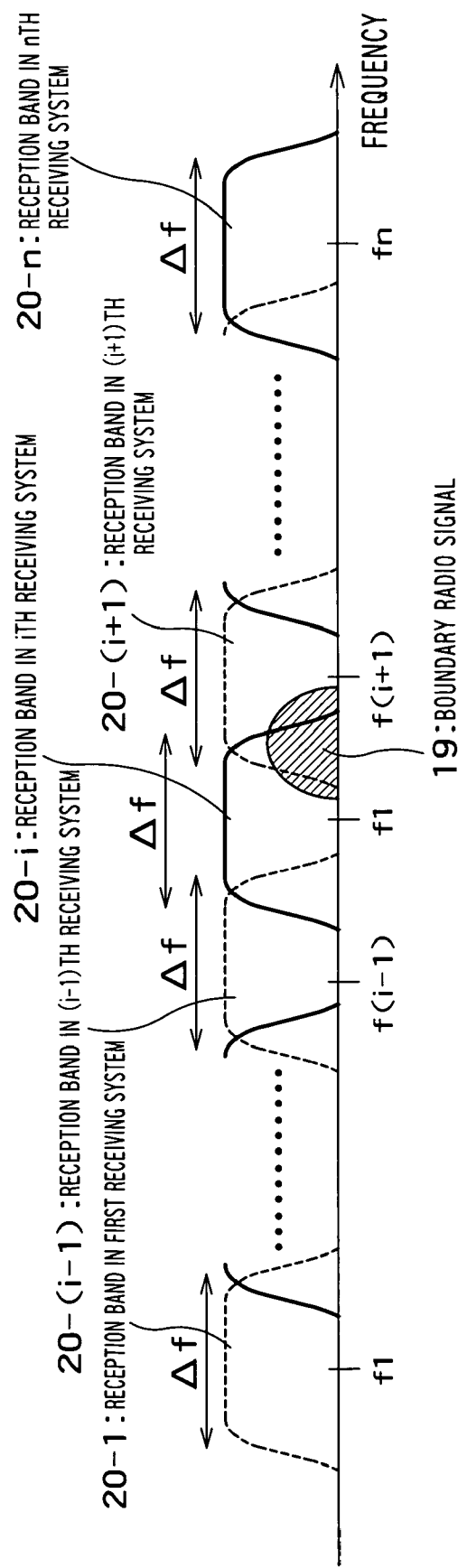
FIG. 12 is a diagram showing reception bands of receiving systems in a radio receiver shown in FIG. 11 and a boundary radio signal spreading across a plurality of reception bands.

By the way, when conducting the maximum ratio combining method or the equal gain combining method, it is preferable that LNAs in receiving systems with adjacent reception bands are different. A configuration example of a receiver in which adjacent receiving systems are connected to different LNAs is shown in FIG. 11. FIG. 12 shows the state in which receiving systems that are adjacent in reception band are connected to mutually different LNAs and a boundary radio signal is incorporated in a boundary portion of reception bands. Receiving systems having reception bands indicated by dotted lines and receiving systems having reception bands indicated by solid lines are connected to different LNAs. In FIG. 11, there are two LNAs, i.e., LNA 2-1 and LNA 2-2, and alternate receiving systems are connected to different LNAs. If the number of receiving systems including an overlapped frequency is at most two at any frequency as shown in FIG. 12, alternate receiving systems are connected to different LNAs as shown in FIG. 11. If three receiving systems are overlapping at any frequency, preferably, three LNAs are provided and the receiving systems are connected to mutually different LNAs at the overlapping frequency. In FIG. 11, alternate receiving systems are connected to different LNAs as an arrangement on the block diagram. In the actual circuit layout, however, it is not necessary that the receiving systems are arranged in the order of frequency. For example, receiving systems connected to the same LNA may be arranged closely.

By thus connecting receiving systems adjacent in reception band to different LNAs, correlation is lost in noise components added in the LNAs to signals input from different receiving systems at the same frequency point when the combining is conducted. Since signals are added coherently, the signals are added in amplitude; however, since noises having no correlation are added incoherently, the noises are added in power. As a result, the signal-to-noise ratio after the combining is improved. Even if the same LNA is used, an effect of reduction of the quantization noise by the combining is obtained; however, by changing the LNAs, noise in the LNA can also be reduced.

In FIG. 11, not only alternate receiving systems are connected to different LNAs, but also the different LNAs are connected to different antennas, respectively. The least condition required to obtain the above-described effect is that the LNAs are different. However, power obtained with one antenna is finite, and radio signals are very weak in most cases. In addition, the signal-to-noise ratio of the LNA output greatly depends on the power input to the LNA. If the output of one antenna is divided to two LNAs, the signal-to-noise ratio is degraded as compared with the case where division is not conducted, in most antennas having one feeding point (although it depends on the structure of the antenna). In order to obtain the noise suppression effect, therefore, it is desirable to connect LNAs respectively to different antennas as shown in FIG. 11 and ensure sufficient power input to each of the LNAs.

If antennas are different, no same signal is input in most cases although it depends on the frequency and the arrangement and directivities of the antennas. Even if the directivities of the antennas are the same and the antennas are placed nearby, fading states of received signals differ if the frequency is high. If the directivities or positions of the antennas are clearly different, it is a matter of course that received signals are different. In conducting the combining in such a case, in the maximum ratio combining method, a better signal-to-noise ratio can be obtained by determining the power ratio on the basis of power at each frequency point as compared with determining the power ratio on the basis of simply the filter characteristics.

A relation between the down conversion frequency in each receiving system and the sampling frequency (sampling rate) in the A/D converter in the case where the boundary radio signal is received will now be described.

As often described heretofore, it is necessary to conduct combining and restoration by aligning, in relative frequency relation, boundary radio signals partially A/D-converted respectively in a plurality of receiving systems. Therefore, it is necessary to hold the relation between the down conversion frequency difference and the sampling frequency in a specific condition. As for this condition, a parameter that determines the condition slightly differs according to the domain of processing at the time of combining, i.e., time or frequency. Under most execution conditions, however, it can be regarded as the same condition.

Figure 13:
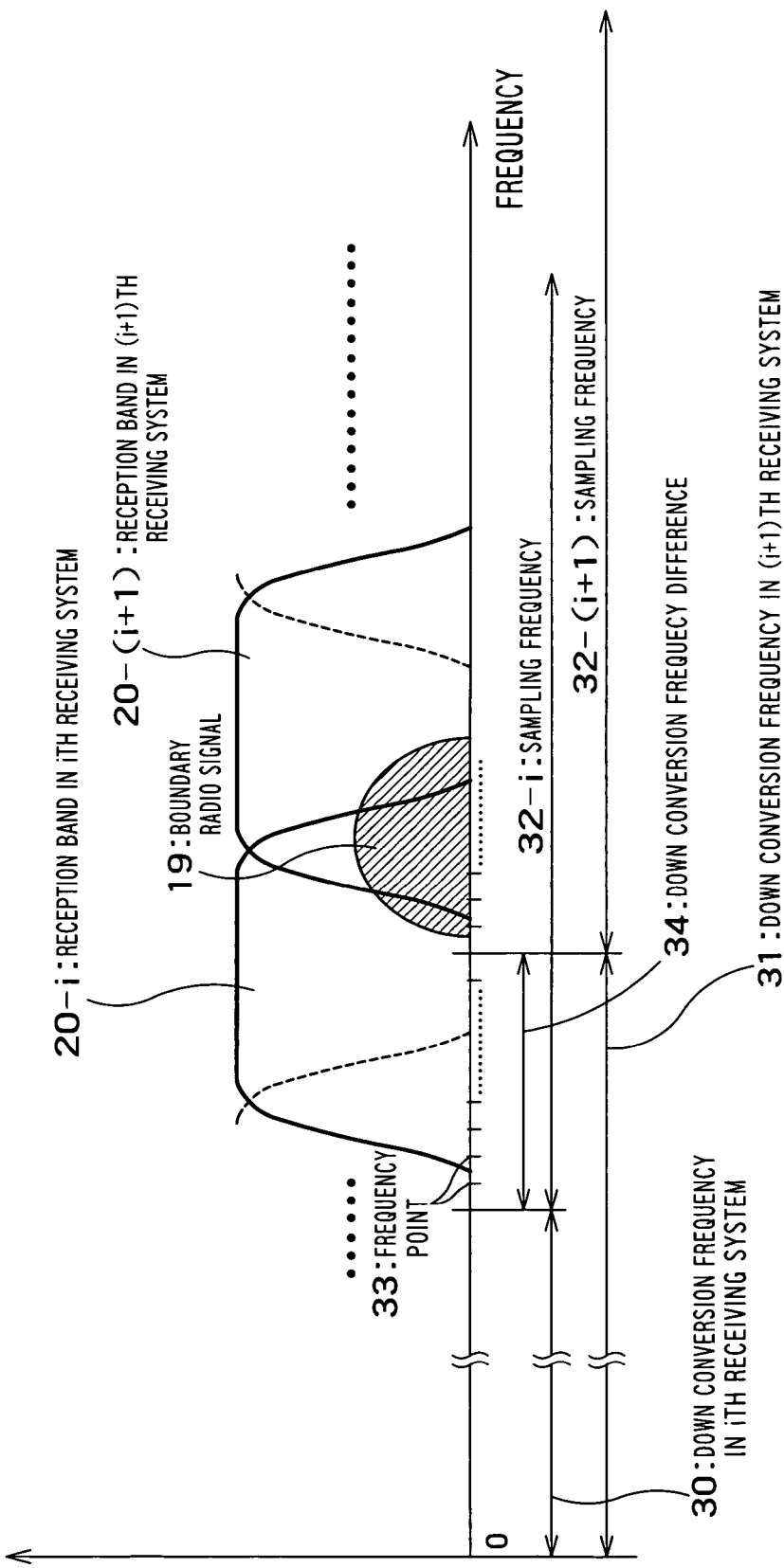
FIG. 13 is a diagram showing a relation between a down conversion frequency difference and a sampling frequency.

The condition will now be described in detail with reference to FIG. 13. It is now supposed that the boundary radio signal 19 spreads across the ith receiving system and the (i+1)th receiving system. Each of these reception bands is converted to an IF frequency by the down converter, and then subject to A/D conversion. Down conversion frequencies in respective reception bands are denoted by 30 and 31 in FIG. 13, and both reception bands are converted to substantially the same IF frequency. Reference numeral 34 denotes a down conversion frequency difference between these two adjacent receiving systems. Each of reference numerals 32-$i$ and 32-($i$+1) denotes a sampling frequency (a reciprocal of the sampling interval time) at the time of the A/D conversion. After the A/D conversion, the signal in each receiving system is subjected to FFT to obtain a signal in the frequency domain. A reciprocal of a frame length at the time of FFT, i.e., a frequency corresponding to the frame length becomes an interval between frequency points 33 in the signal transformed into the frequency domain. By the way, the number of samples in the frame is the number obtained by dividing the sampling frequency by the frequency point interval. In the case where processing is conducted in the frequency domain in the present embodiment, at least during the reception processing of the boundary radio signal, the down conversion frequency difference must be equal to an integer times as long as the frequency corresponding to the frame length, i.e., the frequency point interval, and be constant in the receiving systems associated with the reception processing. By doing so, the number of the frequency point in the ith receiving system that lies upon the frequency point corresponding to the frequency 0 in the (i+1)th receiving system always becomes constant. In addition, frequency points in both systems exactly lie one upon another in the frequency band in which the reception bands overlap. It is supposed that the frame length is the same in both receiving systems. As a result, the correspondence relations in frequency point after the FFT between both systems become clear, and it becomes possible to restore a correct frequency relationship before conducting the combining. As a matter of course, it doesn't matter if the down conversion frequency and the frame length in each receiving system are always kept at constant values independently. As will be appreciated from the foregoing description, however, the stability of absolute values poses no problem as long as the above-described ratio is kept at a constant integer.

Even when the absolute values slightly deviate, since the relative relation between the down conversion frequency difference 34 and the frequency point 33 is maintained, there is no change in the correspondence relation in frequency points between both systems. That is the reason why the stability of absolute values poses no problem.

As heretofore described, what poses a problem when conducting processing in the frequency domain is the frame length. Neither the number of samples in the frame nor the sampling frequency poses a problem in principle. However, the number of samples when conducting the FFT is typically determined to be a factorial of 2. When the number of the samples is increased or decreased, it is increased or decreased by an extreme unit such as an increase to twice or a decrease to half. In addition, in the present embodiment, the receiving systems have almost the same reception bandwidth. Therefore, the state in which the sampling frequency, i.e., the number of samples differs from system to system although the frame length is the same is not apt to occur. In ordinary cases, therefore, the above-described condition becomes equivalent to the condition that the ratio between the down conversion frequency difference and the sampling frequency is constant.

Figure 15:
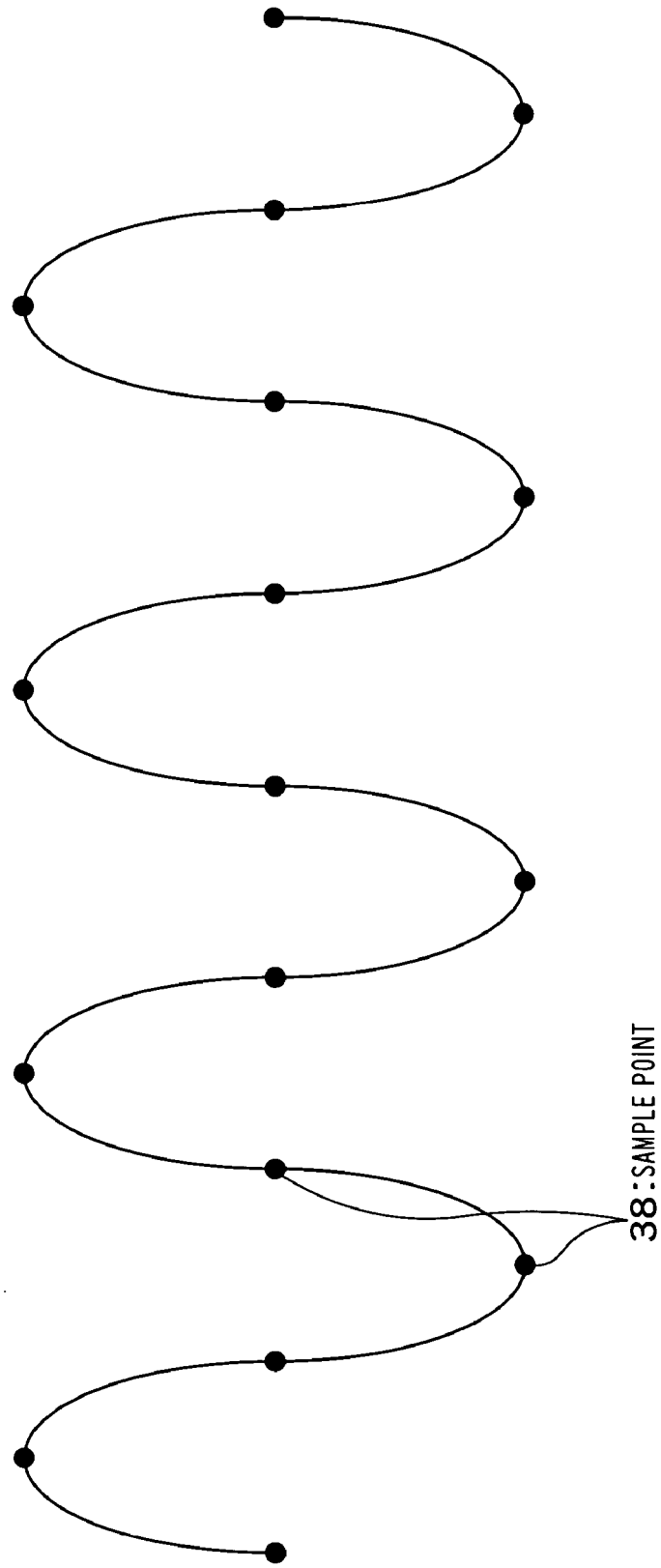
FIG. 15 is a diagram showing an example in which one period of a sine wave is represented by four sample points.

When conducting the combining processing in the time domain, the condition heretofore described becomes the condition that the ratio between the down conversion frequency difference and the sampling frequency is constant. This will now be described specifically. In the case of the time domain processing, to speak in plain language, what determines the frequency of the digitized signal is the number of points required to represent one period of a sine wave at that frequency. FIG. 15 shows an example in which one period of a sine wave is represented by four sample points. The frequency differs depending upon whether the number of samples is 5, 3 or 4.1. At a certain frequency in a boundary radio signal received in the ith receiving system in the frequency relation as shown in FIG. 13, the number of points used to represent one period is determined by the frequency 0 at the time of the A/D conversion, i.e., a down conversion frequency 30 and a sampling frequency 32-$i$. The same is true of the (i+1) receiving system as well. If the sampling frequency changes, the represented frequency changes even if the number of points is the same 4. What is important at this time is that the ratio of the frequency represented by four points with the certain sampling frequency to the down conversion frequency difference is constant irrespective of the sampling frequency. For example, in FIG. 13, to represent a frequency corresponding to the down conversion frequency of the (i+1)th receiving system in the ith receiving system, it is required that the difference in down conversion frequency between the two systems be represented by a constant ratio to the sampling frequency. By doing so, one period of a frequency corresponding to the down conversion frequency in the (i+1)th receiving system can always be represented by a definite number of sample points in the ith receiving system. In other words, frequency correspondence between the ith receiving system and the (i+1)th receiving system is established definitely. The same is true of other frequency points as well. When the sampling frequency is the same in both systems, the condition that a frequency represented with a definite ratio to the sampling frequency in a first system becomes always equal to a frequency represented with another definite ratio to the sampling frequency in a second system is that a frequency corresponding to 0 in the second system is always represented with a definite ratio in the first system. These conditions can be expressed in that the down conversion frequency difference has a definite ratio to the sampling frequency. It is a matter of course that in this case as well the same effect is obtained even if the down conversion frequency and the sampling frequency in each system are absolutely fixed. More simply, however, only the ratio may be fixed. If only the ratio is fixed, the absolute frequencies of the frequencies associated with each other in both systems might fluctuate. However, fixing only the ratio is sufficient to correctly keep the frequency relation at the time of combining.

By doing so, the frequency relation between both systems after the sampling becomes clear and it is possible to make the frequency relation between boundary radio signals partially obtained from a plurality of systems correct.

Figure 14:
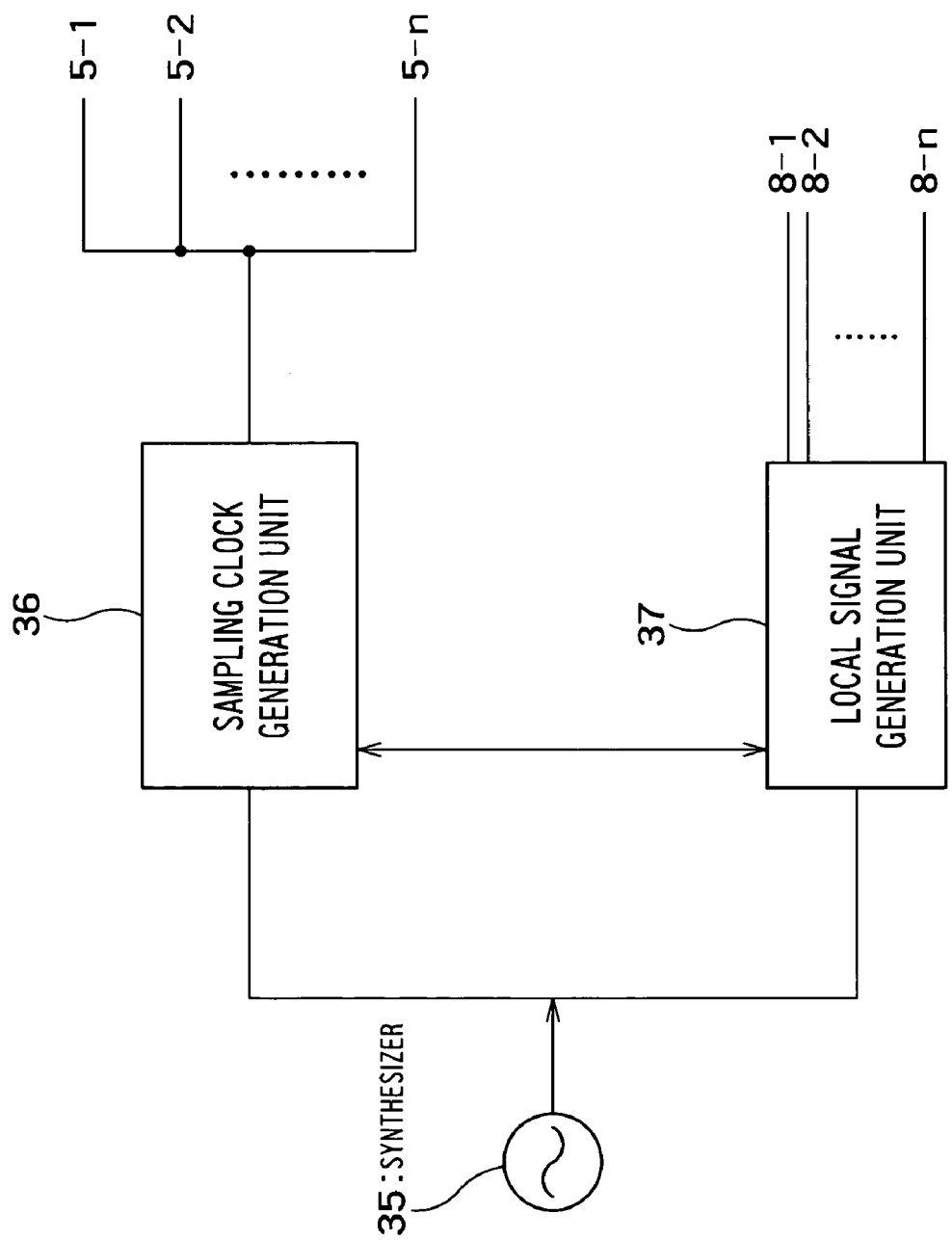
FIG. 14 is a diagram showing a configuration which generates a local signal and a sampling clock from an output of one frequency synthesizer.

For executing such a condition, preferably, a local signal for down conversion and a sampling clock are generated from an output of one frequency synthesizer 35 as shown in FIG. 14. Each of a sampling clock generation unit 36 and a local signal generation unit 37 is composed of components such as frequency demultipliers, frequency multipliers, and combiners, and outputs a signal completely synchronized to the output of the synthesizer 35. Ratios of the output signal frequency of the synthesizer 35 to the frequencies of the output signals of the sampling clock generation unit 36 and the local signal generation unit 37 are fixed at least while the boundary radio signal is being received, and the difference between down conversion frequencies is controlled so as to have a definite ratio to the sampling frequency. Outputs of the local signal generation unit 37 are connected to local input terminals 8 of the down converter 4 in FIG. 2. Outputs of the sampling clock generation unit 36 are input to the A/D converters 5, and used as a clock at the time of sampling. (In FIG. 2, sampling clock input terminals are not illustrated in the A/D converters.)

The form shown in FIG. 14 can be used either in the frequency domain or in the time domain. In the case of the frequency domain, however, the number of FFT samples in the digital signal processing unit is made the same (or made to have a relative relation of a factorial of 2) in both systems.

Without using the form shown in FIG. 14, when different frequency synthesizers are used in respective systems or different frequency synthesizers are used for the local signal generation unit and the sampling clock generation unit, those frequency synthesizers should be synchronized by using a PLL (Phase Locked Loop) while receiving the boundary radio signal.

By the way, another condition required to correctly combine boundary radio signals partially received by a plurality of receiving systems is that there is no delay time difference when combining signals received in those receiving systems. It is a matter of course that a delay difference should not exist between receiving systems using the time domain combining. In addition, when conducting processing in the frequency domain, the timing to take the FFT frame must be the same in the relevant receiving systems.

There are several causes of the delay difference generation. One of them is that the circuit wiring length differs from receiving system to receiving system at the time of designing. This can be made small by effort in the circuit layout; however, it is difficult to eliminate. Although there is slight delay variation due to the temperature variation or the like, the variation after the manufacture of the radio machine is minute.

In the case where different LNAs are used in adjacent systems and different antennas are connected to respective LNAs, the propagation distances which the boundary radio signals experiences until they enter the antennas differ in many cases. Its main cause is the distance between the antennas. In this case, there is a possibility that the delay difference will be varied by a change in the angle of the receiver to the radio wave arrival direction, and it cannot be predetermined.

As the method above, there are two methods for correcting the delay difference: a method of correcting the delay difference fixedly, and a method of correcting the delay difference dynamically.

Figure 18:
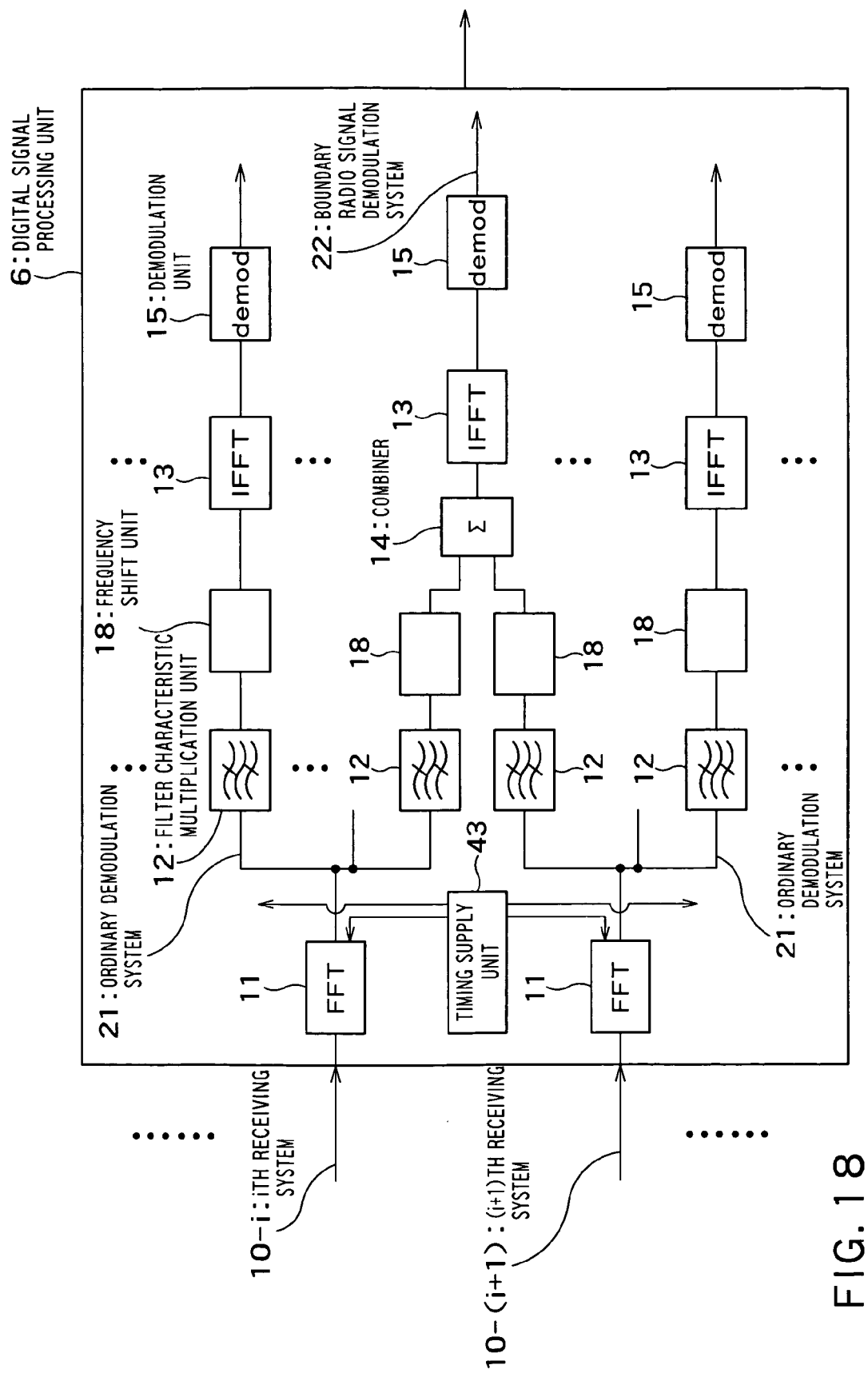
FIG. 18 is a diagram showing an example of the digital signal processing unit including a timing supply unit.

First, as for the fixedly correcting method, the delay difference can be grasped at the development stage using the circuit layout and delay characteristics. When final circuit design is completed and trial manufacture is conducted, preferably, the delay time difference between systems is measured and input to the digital signal processing unit 6 in advance. For example, a test signal having a frequency at which reception bands overlap is input to the LNAs, and A/D conversion is conducted separately in the receiving systems capable of receiving the test signal. In the case of the frequency domain processing, each receiving system stores temporarily the input numerical value sequences in memories to form a frame for FFT. The numerical value sequences in those receiving systems are compared with each other to detect a delay time difference. The test signal input to the LNAs is, for example, a sine wave having a specific frequency. Overlapping portions are at ends of reception bands in many cases, and the phase rotation at the reception band end is corrected separately as described above. Therefore, only the delay time difference is corrected except the phase rotation. Before measuring the delay difference, the phase rotation caused by the filter end should be measured. The amount compensated at a filter characteristic compensation step is previously subtracted. Then, the delay time difference between systems and the timing difference at the time of framing are calculated. The timing difference is represented by the number of clocks. When framing in each system, the framing is done at timing shifted by the number of clocks. In other words, as shown in FIG. 18 which shows another configuration example of the digital signal processing unit, preferably, a timing supply unit 43 which supplies framing timing is provided in the digital signal processing unit to supply framing timing to respective systems. If the delay difference exceeds one period of the sine wave test signal because the delay time difference between systems is long or the measurement frequency is high, preferably, a signal modulated by a low rate fixed pattern is used as the test signal.

Such a measurement is conducted every adjacent systems. Preferably, instead of correcting each of the delay difference between adjacent systems at the time of receiving the boundary radio signal, delay differences among all systems are corrected in advance. Because the FFT is substantially always conducted as long as a signal in the reception band is received and it might be difficult to change the FFT frame timing when reception of a boundary radio signal is started.

Also when conducting processing in the time domain, substantially the same processing is conducted. A sine wave or modulated wave test signal having a frequency at which reception bands overlap is input, and the A/D conversion and ordinary processing are conducted in respective systems. After the arrival at the combiner, at least the phase rotation of the filter characteristics is corrected, and signals in both systems are compared with each other. If a delay difference is detected as a result of comparison, it is recorded. When adding up signals from both systems in the combiner, the signal delay difference is corrected according to the recorded value and then the signals are added up.

The above-described procedure may be conducted at the time of development of the receiver. Or it is also possible to equip a receiver with a test-signal-input-and-detect mechanism, conduct the above-described processing to conduct correction in the receiver when power of the receiver is turned on or periodically, and thereby prepare for the deterioration with age and temperature change.

A method for dynamically compensation when there are a plurality of antennas will now be described. In this case as well, preferably, the delay difference generated fixedly by a propagation distance difference in the circuit is compensated by using the above-described method.

If the delay difference changes according to the radio wave arrival direction, the delay difference cannot be detected until the boundary radio signal is received. Furthermore, if this radio system permits the transmission and reception while moving, there is a possibility that the delay difference will change with time. Therefore, it is necessary to conduct the delay difference compensation by using the boundary radio signal itself. If the boundary radio signal has a signal for synchronization such as a preamble, preferably, the preamble is used. If the boundary radio signal does not have a signal for synchronization, the delay difference compensation is conducted by using the boundary radio signal itself.

First, the case where the combining processing is conducted in the time domain will now be described. When the correction is conducted by using the preamble, the processing depends upon the frequency configuration of the preamble, and if the preamble has a sinusoidal waveform or a repeated waveform similar to the sinusoid, the following processing is conducted. While receiving the preamble, waveforms input to the combiner are compared and a delay difference is detected and stored. At the time of subsequent packet content reception, combining is conducted with a shift of the delay difference in the combiner. It is desirable to detect the delay difference in the preamble as early as possible and use the rest of the preamble for other required processing (such as bit rate synchronization and the packet frame synchronization). If the preamble has a wide bandwidth, preferably, the same specific bands in the preamble are filtered out from both systems and compared with each other.

Figure 17:
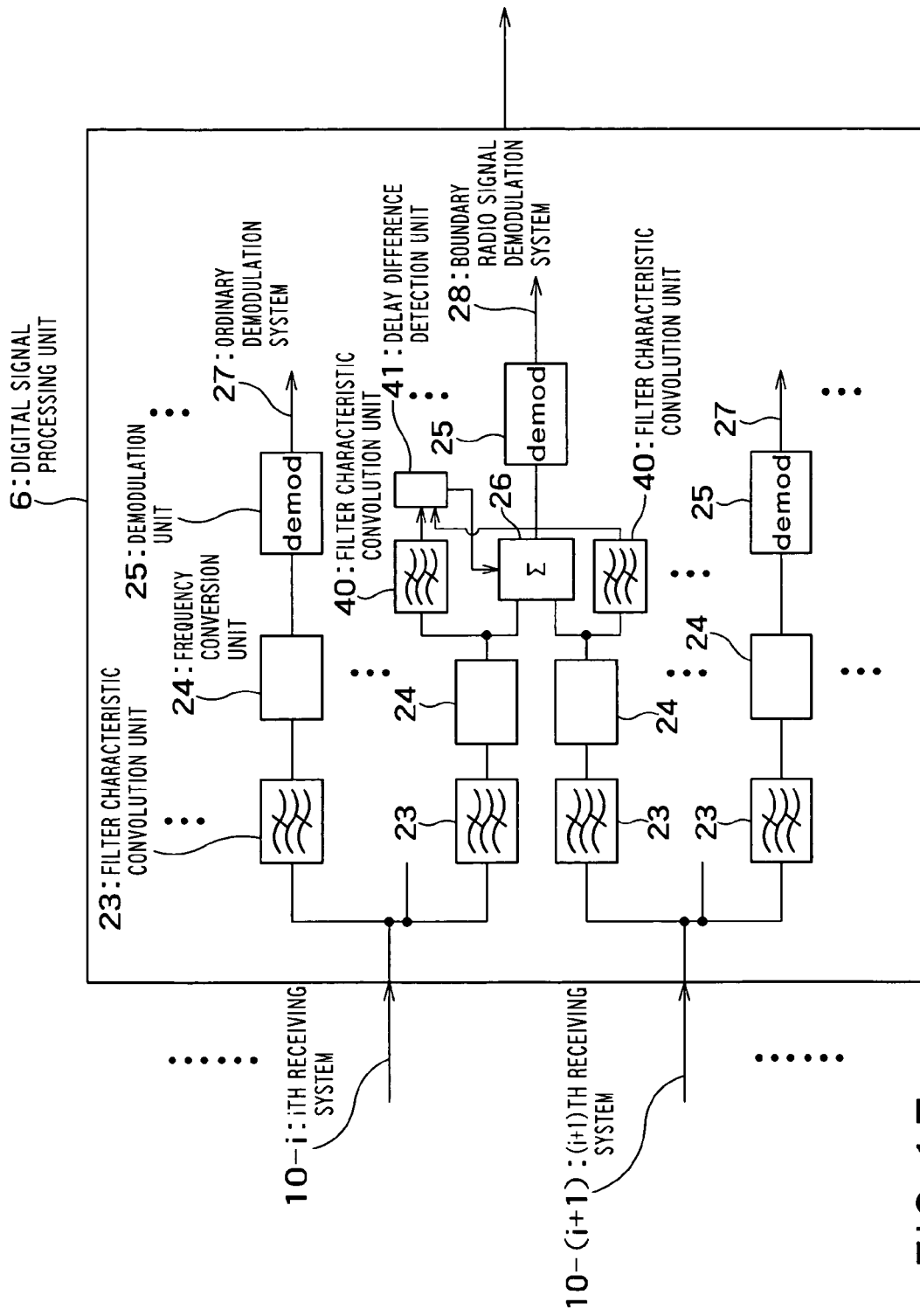
FIG. 17 is a diagram showing another configuration example of a digital signal processing unit having a function of dynamically correcting a delay difference.

If the detection of the delay difference cannot be completed by using only the early portion of the preamble or a signal for synchronization such as the preamble is not provided, the following processing may be conducted. As shown in FIG. 17 which shows another configuration example of the digital signal processing unit, in each of two receiving systems connected to a boundary radio signal demodulation system 28, an output of a frequency conversion unit 24 is branched and another filter characteristic convolution unit 40 is disposed in one branch. As a result, a specific frequency or a narrow band is extracted from the boundary signal portion and input to a delay difference detection unit 41. Waveforms are compared with each other, and the delay difference is detected. In this case, it is desirable to conduct the phase correction beforehand among the corrections of characteristics at the filter end, in the filter characteristic convolution unit 23 so as to prevent the phase rotation at the ends of the RF filter and the IF filter band from affecting the delay difference detection. The combiner 26 is notified of the detected delay difference, and the combiner 26 combines the signals with a shift of the delay difference.

It is desirable that the detection of the delay difference can follow the change of the delay difference. If the delay difference is detected by using the preamble, the delay difference may be detected every preamble and applied to the packet. If the delay difference changes very slowly, the delay difference may not be detected for all packets. If detection is conducted in parallel as shown in FIG. 17, preferably, the combiner is notified when a meaningful change has occurred in the delay difference. The meaningful change means a delay difference change to a degree that fading occurs in the band of the boundary radio signal by the delay difference change and the reception sensitivity is degraded.

Figure 16:
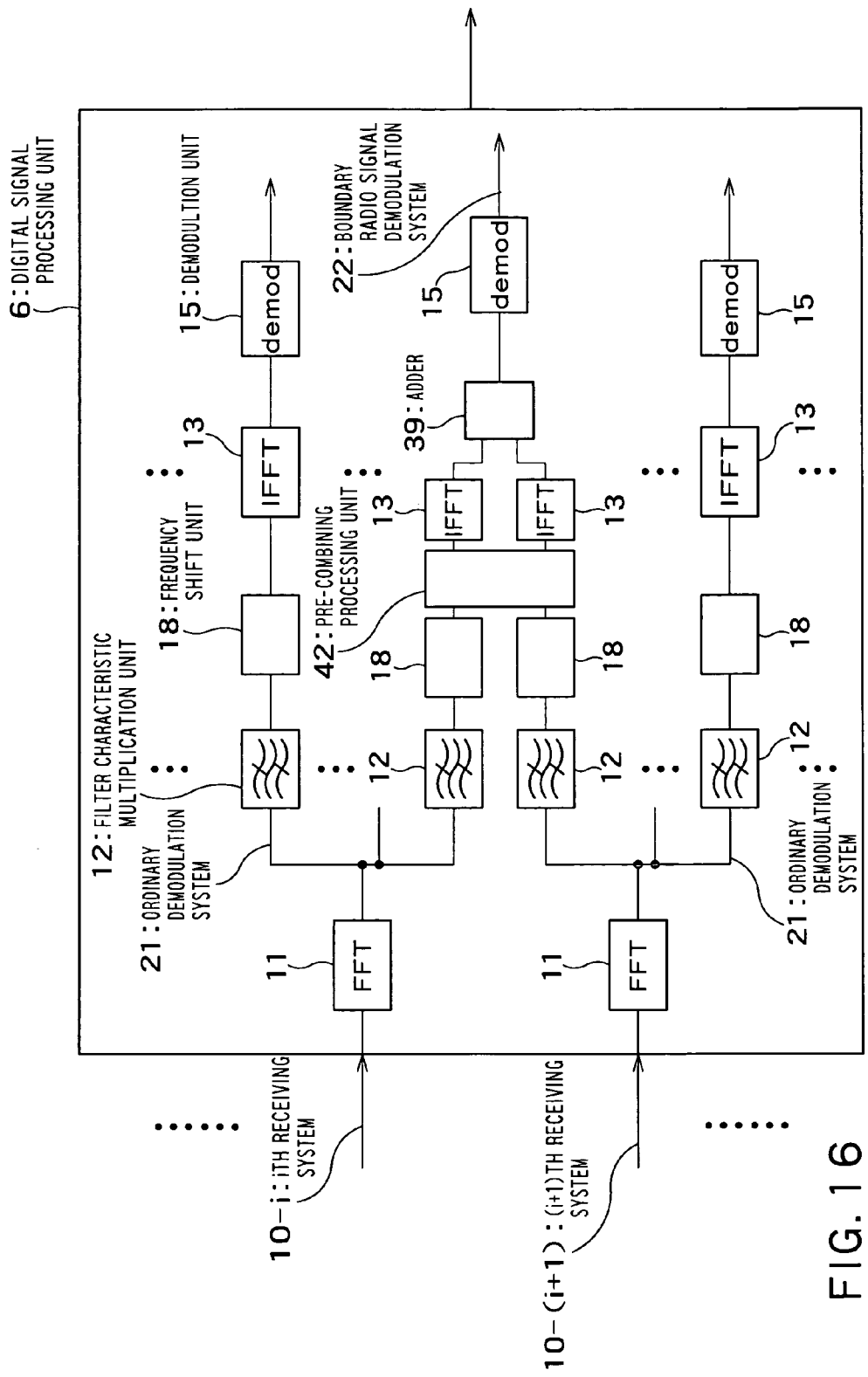
FIG. 16 is a diagram showing a configuration example of a digital signal processing unit having a function of dynamically correcting a delay difference.

The case where the combining processing is conducted in the frequency domain will now be described. If the delay difference cannot be predicted and the delay difference changes according to the arrival direction of the boundary radio signal, it is very difficult to collectively correct the delay differences in all systems like the case of the fixed delay difference. Therefore, it is difficult to align the FFT framing timing according to the delay difference. If the FFT frame timing is misaligned, fading occurs when conducting the combining in the frequency domain. As shown in FIG. 16 which shows another configuration example of the digital signal processing unit, preferably, the IFFT is conducted on the signal in the frequency domain to restore it to a signal in the time domain and conduct combining processing. Preferably, however, all of the processing conducted in the combining processing other than the addition, i.e., phase and amplitude correction and processing such as weighting and frequency selection which becomes necessary depending on the combining method is conducted in a pre-combining processing unit 42, and then a temporal waveform is restored and the delay is corrected and addition is conducted in an adder 39.

Detection of the delay difference in this case is substantially the same as that in the case of the time domain. If the preamble can be utilized, preferably, the delay difference is detected by preamble waveform comparison in the adder 39. Otherwise, preferably, a mechanism similar to that shown in FIG. 17 is provided between an IFFT unit and the adder to detect the delay difference. In the case of the selective combining method, however, the same frequency component (frequency point) cannot be extracted. Preferably, therefore, after the filter phase is corrected in the pre-combining processing unit, then some frequency components to detect the delay difference is extracted and subjected to the IFFT separately to detect the delay difference.

In the foregoing description, it has been supposed that the reception bandwidth of the receiving systems is the same and fixed, reception frequencies are fixed, and the sampling frequency is the same and substantially fixed. However, the reception bandwidth may differ from receiving system to receiving system. As a result, the sampling frequency may change with a factorial of 2 times depending on the bandwidth. In such a case, however, since the shortage of sampling points may occur by a difference in sampling frequency interpolation processing may be necessary when conducting the combining processing.

In addition, the reception frequency may be variable. However, since one of objects of the present invention is to make it possible to receive in a wide range radio signals whose frequencies and bandwidths are unclear, by using a fixed number of receiving systems, the reception frequency may be made variable without departing from this object. For example, the frequency band is divided into several parts, and the frequency band that can be used by the receiver is assigned semi-fixedly according to the place and term. In one frequency band among them, the way of use presented in this invention is executed. In such a case, the reception frequency may be made variable. In a system in which only a specific frequency part is used in one place for a definite term, but switchover to another frequency band is requested when the place or the time changes, the reception frequency may be made variable.

The present embodiment heretofore described can be briefly summarized as follows.

(1) The cognitive radio receiver in the embodiment of the present invention has a plurality of receiving systems. The present receiver is used to receive a plurality of radio signals each having a center frequency and a bandwidth that are indefinite in a wide range. Unlike the conventional technique example, however, each receiving system is not tuned to an individual radio signal. In a plurality of receiving systems in the present receiver, adjacent reception bands overlap. Each reception band is substantially fixed, or fixed at least during reception of a radio signal contained in its reception band. The whole range of frequencies to be received by the present receiver is covered by the plurality of receiving systems. Each receiving system samples signals in its reception band by using an A/D (analog-digital) converter, and converts the signals to digital signals. Each receiving system extracts a radio signal to be demodulated, from among the digital signals by using digital processing, and demodulates it. The input bandwidth of the A/D converter, i.e., the reception bandwidth is determined by a filter inserted in a stage preceding the A/D converter. The bandwidth of each filter is independent of the frequency and bandwidth of an individual radio signal to be received. One feature of the present receiver is that all signals passed through the filter are temporarily converted to digital signals and only a signal to be received is extracted from among the digital signals by digital processing and demodulated. In such a form, each of radio signals to be received is not necessarily incorporated completely in the reception band of any receiving system, and a radio signal to be received might spread across more than two adjacent reception bands sometimes. In the conventional radio receiver, a receiving system never has a receiving band which cannot cover completely the frequency of the signals to be received. The present receiver receives a boundary radio signal that spreads across a boundary between reception bands without shifting the reception bands of respective receiving systems. Therefore, a signal obtained in one receiving system is only a part of the boundary radio signal. In each of more than two receiving systems containing the boundary radio signal in their reception bands, a part concerning the boundary radio signal is extracted, and the extracted partial signal is corrected with respect to a amplitude and a phase at the filter end. Thereafter, the corrected signals are combined to restore the boundary radio signal. The boundary radio signal is demodulated to obtain necessary data. Since receiving systems that are adjacent in frequency have overlapping reception bands, each frequency point of the boundary radio signal is received in at least any one of receiving systems with a moderate signal-to-noise ratio. Therefore, it is prevented that the receiver cannot receive the boundary radio signal due to an insufficient signal-to-noise ratio.

By doing so, it becomes possible for a fixed number of receiving systems to receive a plurality of radio signals in which center frequencies and bandwidths are indefinite beforehand in a wide range and the number is undetermined.

(2) A signal input to each receiving system is a signal having a radio frequency (RF). Since the RF frequency is sufficiently high as compared with the bandwidth of each radio signal in most cases, the RF frequency is down-converted to an intermediate frequency in order to be input to the A/D converter. In the embodiment of the present invention, the IF is substantially the same frequency in any receiving system. Since reception bands of respective receiving systems are different in RF center frequency, the down conversion frequency differs from system to system when down-converting the RF signals to the same IF. In the embodiment of the present invention, the ratio of the difference between down conversion frequencies in a plurality of receiving systems containing a boundary radio signal in the reception band to the sampling frequency used at the time of A/D conversion of the received signal is kept constant at least during the reception of the boundary radio signal.

As a condition for properly combining boundary radio signals supplied from a plurality of receiving systems and restoring the original boundary radio signal, the relation between the parts of the boundary radio signal received by respective receiving systems must be clear.

The digital signal obtained in each receiving system is the IF signal and the IF band has substantially the same center frequency in all receiving systems. Accordingly, parts of the boundary radio signal obtained in the receiving systems are deviated in relative frequency position by the down conversion. Therefore, it is necessary to make frequency position relations proper before conducting the combining. At that time, it is a matter of course that the down conversion frequency in each receiving system is definite. In addition, the ratio of the sampling frequency to the difference in down conversion frequency between systems is made constant. After the whole reception band is sampled, parts concerning the boundary radio signal are extracted by digital filtering processing and subject to frequency shift. The sampling frequency determines frequency points at the IF. Since the ratio is kept constant, therefore, frequency shift values in digital processing at the time of combining can be decided properly. In other words, a frequency at the IF in one system can be properly corresponded to a certain frequency at the IF in the adjacent system.

By doing so, it becomes possible to conduct proper combining.

(3) When extracting parts of the boundary radio signal from signals digitized in a plurality of receiving systems and combining the parts, the signals are transformed in advance into the frequency domain and then the combining is conducted. A signal obtained by conducting the sampling and digitization in the A/D converter is a sequence of values on the time axis. This is divided into frames, subjected to the FFT and transformed to a signal in the frequency domain. When transformed into the frequency domain, the frequency distribution of the signal in the reception band becomes definite, and frequency processing such as the filtering and the frequency conversion can be conducted easily. Furthermore, as compared with the case where complicated frequency processing is conducted on the time axis, it becomes possible to reduce the accumulation of round off errors.

(4) When combining parts of the boundary radio signal obtained from a plurality of receiving systems, the selective combining method, the equal gain combining method or the maximum ratio combining method is used. In the present receiver, the boundary radio signal is shaved off at a reception band end in one receiving system. As the boundary radio signal approaches the band end, the signal-to-noise ratio after the digitization becomes worse. Especially by using the maximum ratio combining method, the noise can be suppressed most.

By doing so, it becomes possible to restore the boundary radio signal with a better quality.

(5) As for noise added in the present receiver, noise added in the preamplifier (LNA: Low Noise Amplifier) disposed immediately after the antenna and quantization noise added in the A/D converter are dominant. Since temporal waveforms of signals subjected to the A/D conversion in respective receiving systems are basically independent, quantization noises are independent from system to system and its contribution can be suppressed by the maximum ratio combining method. If signals input to a plurality of systems to be combined are an output of the same LNA, the contribution of the LNA noise cannot be suppressed even with the maximum ratio combining method. It is because there is correlation in the noise of the LNA even if the receiving systems are different. Therefore, outputs of different LNAs are used in receiving systems having adjacent reception bands. In other words, receiving systems having overlapping reception bands are connected to different LNAs. By doing so, correlation is lost in noises caused by the LNAs between a plurality of receiving systems used to restore the boundary radio signal. Therefore, noise contribution can be suppressed by the maximum ratio combining method, and the signal-to-noise ratio can be further improved.

(6) In the case where the combining processing is conducted in the frequency domain, the ratio of the difference in down conversion frequency between receiving systems to the frequency corresponding to the frame length used when conducting the FFT is kept at a constant integer value in order to make relative frequency relations in a plurality of receiving systems containing the boundary radio signal proper. In the case where processing is conducted in the frequency domain, the interval between frequency points after the FFT depends upon neither the sampling frequency nor the number of samples in a frame used when conducting the FFT, but it depends upon only the frame length. The difference in down conversion frequency between receiving systems is the difference between RF frequencies corresponding to IF frequency of 0 when input to A/D converters. Therefore, the fact that a value obtained by dividing the down conversion frequency difference by a frequency corresponding to the frame length is a definite integer means that an integer number of frequency points exist between RF frequencies corresponding to the IF frequency of 0 in both systems and the number is definite. As a result, the relative frequency relation between both systems can be always kept at an already known definite state. By the way, the condition in (6) is equivalent to the condition (2) under the condition that the numbers of samples in frames used with FFT in both systems are the same.

What is claimed is:

1. A radio receiver comprising:

one or more antenna to receive radio signals;

a plurality of filters to selectively output signals in respective reception bands from the radio signals received by the antenna, adjacent reception bands partially overlapping each other;

a plurality of down converters disposed correspondingly to the filters to conduct down-conversion from radio frequency to intermediate frequency on signals output from respective ones of the filters;

a plurality of A/D converters disposed correspondingly to the down converters to convert the signals on intermediate frequency output from respective ones of the down converters to digital signals;

extracting units to extract signal components of a boundary radio signal spreading across at least two reception bands adjacent to each other from digital signals associated with the at least two reception bands adjacent to each other;

a combining unit to combine the signal components extracted by the extracting units to restore the boundary radio signal; and a demodulation unit to demodulate the boundary radio signal restored by the combining unit, wherein as regards down converters and A/D converters which conduct processing on the at least two reception bands adjacent to each other, a ratio of a down conversion frequency difference between the down converters to a sampling frequency used in the A/D converters is definite.

2. The radio receiver according to claim 1, further comprising:

a frequency synthesizer;

a sampling clock generation unit to generate sampling clocks to be supplied to the A/D converters, by using a frequency synthesizer output; and a local signal generation unit to generate local signals for the down converters, by using the frequency synthesizer output.

3. A radio receiver comprising:

one or more antenna to receive radio signals;

a plurality of filters to selectively output signals in respective reception bands from the radio signals received by the antenna, adjacent reception bands partially overlapping each other;

a plurality of down converters disposed correspondingly to the filters to conduct down-conversion from radio frequency to intermediate frequency on signals output from respective ones of the filters;

a plurality of A/D converters disposed correspondingly to the down converters to convert the signals on intermediate frequency output from respective ones of the down converters to digital signals;

a plurality of FFT units disposed correspondingly to the A/D converters to conduct fast Fourier transform on digital signals generated by respective ones of the A/D converters;

extracting units which extract signal components of a boundary radio signal spreading across at least two reception bands adjacent to each other from transformed digital signals associated with the at least two reception bands adjacent to each other;

a combining unit to combine the signal components extracted by the extracting units to restore the boundary radio signal;

an IFFT unit to conduct inverse fast Fourier transform on the boundary radio signal restored by the combining unit; and a demodulation unit to demodulate the transformed boundary radio signal, wherein as regards down converters and FFT units which conduct processing on the at least two reception bands adjacent to each other, a ratio of a down conversion frequency difference between the down converters to a reciprocal of a frame length used in the FFT units is definite.

4. The radio receiver according to claim 3, further comprising:

a frequency synthesizer;

a sampling clock generation unit to generate sampling clocks to be supplied to the A/D converters, by using a frequency synthesizer output; and a local signal generation unit to generate local signals for the down converters, by using the frequency synthesizer output.

5. The radio receiver according to claim 3, further comprising a timing supply unit to supply a timing signal indicating a timing of framing to each of the FFT units that conduct processing on the signals of at least two reception bands adjacent to each other, on the basis of a previously given delay difference of digital signals input to the FFT units.

* * * * *